US011441642B2

(12) United States Patent
Tory

(10) Patent No.: US 11,441,642 B2
(45) Date of Patent: Sep. 13, 2022

(54) HYPOCYCLOID SPEED BUFFER

(71) Applicant: ECA Medical Instruments, Thousand Oaks, CA (US)

(72) Inventor: David A. Tory, Thousand Oaks, CA (US)

(73) Assignee: ECA Medical Instruments, Thousand Oaks, CA (US)

( * ) Notice: Subject to any disclaimer, the term of this patent is extended or adjusted under 35 U.S.C. 154(b) by 0 days.

(21) Appl. No.: 16/337,909

(22) PCT Filed: Jan. 25, 2017

(86) PCT No.: PCT/US2017/014970
§ 371 (c)(1),
(2) Date: Mar. 28, 2019

(87) PCT Pub. No.: WO2018/044343
PCT Pub. Date: Mar. 8, 2018

(65) Prior Publication Data
US 2020/0011400 A1   Jan. 9, 2020

Related U.S. Application Data

(60) Provisional application No. 62/381,491, filed on Aug. 30, 2016, provisional application No. 62/381,497, filed on Aug. 30, 2016.

(51) Int. Cl.
*F16H 1/32* (2006.01)
*F16H 1/34* (2006.01)
(Continued)

(52) U.S. Cl.
CPC .............. *F16H 1/32* (2013.01); *F16H 1/34* (2013.01); *F16H 25/04* (2013.01);
(Continued)

(58) Field of Classification Search
CPC ... F16H 1/32; F16H 1/34; F16H 25/04; F16H 2001/2881; F16H 2001/323; F16H 2001/327
(Continued)

(56) References Cited

U.S. PATENT DOCUMENTS 3,695,059 A   10/1972 Laubach
3,998,112 A * 12/1976 Pierrat ...................... F16H 1/32
                                                                 475/168

(Continued)

FOREIGN PATENT DOCUMENTS

DE    2427352 A1   12/1975
EP    1110512 A1    6/2001
(Continued)

OTHER PUBLICATIONS

International Search Report dated May 24, 2017, issued in International patent application PCT/US2017/014970 filed Jan. 25, 2017.
(Continued)

*Primary Examiner* — Leslie A Nicholson, III
(74) *Attorney, Agent, or Firm* — Ferguson Case Orr Paterson

(57) ABSTRACT

A reduction assembly, attachable to a torque limiting device, comprising a drive shaft having an input segment, an eccentric segment, and an output segment, wherein the input segment and the output segment each have a centerline running along a same first axis, and wherein the eccentric segment has a center line running along a second axis, the second axis being parallel to the first axis and positioned a first distance away from the first axis. The assembly further comprising a disk assembly having a disk with a body, a plurality of lobes positioned concentrically on the body, and an opening extending through the body, the opening configured to slidably engage the eccentric segment of the drive
(Continued)

shaft. The assembly further comprising a disk receptacle configured to engage with the disk, the receptacle having a floor and a wall with a plurality of protrusions extending from the wall, wherein the number of the plurality of protrusions is equal to one more than the number of the plurality of lobes on the disk.

8 Claims, 19 Drawing Sheets

(51) Int. Cl.
  *F16H 25/04* (2006.01)
  *F16H 1/28* (2006.01)
(52) U.S. Cl.
  CPC ............ *F16H 2001/2881* (2013.01); *F16H 2001/323* (2013.01); *F16H 2001/327* (2013.01)
(58) Field of Classification Search
  USPC ........................................ 475/162
  See application file for complete search history.

(56) References Cited

U.S. PATENT DOCUMENTS

| | | | |
|---|---|---|---|
| 4,177,695 A * | 12/1979 | Grove | F16H 1/32 475/162 |
| 4,316,439 A | 2/1982 | Tyree | |
| 4,643,047 A * | 2/1987 | Distin | F16H 25/06 475/168 |
| 4,829,851 A | 5/1989 | Imase | |
| 4,922,781 A * | 5/1990 | Peiji | F16H 55/08 74/462 |
| 5,145,468 A | 9/1992 | Nagabhusan | |
| 5,180,042 A | 1/1993 | Ogiso | |
| 5,197,930 A * | 3/1993 | Imase | F16H 25/06 475/168 |
| 5,683,323 A | 11/1997 | Imase | |
| 6,132,435 A | 10/2000 | Young | |
| 6,487,943 B1 | 12/2002 | Jansson | |
| 6,745,812 B1 | 6/2004 | Liu et al. | |
| 7,766,750 B2 | 8/2010 | Campbell | |
| 7,938,046 B2 | 5/2011 | Nino | |
| 8,157,691 B2 * | 4/2012 | Stanovskoy | F16H 1/08 475/180 |
| 8,162,790 B2 * | 4/2012 | Imase | F16H 25/06 475/168 |
| 8,221,431 B2 | 7/2012 | Chenaux | |
| 8,365,641 B2 | 2/2013 | Daglow | |
| 9,241,751 B2 | 1/2016 | Nino | |
| 10,131,040 B2 | 11/2018 | Nino | |
| 10,343,269 B2 * | 7/2019 | Nino | B25B 23/0035 |
| 10,422,414 B2 * | 9/2019 | Ho | B60K 17/04 |
| 10,610,429 B2 * | 4/2020 | Heneveld, Jr. | A61G 7/002 |
| 2006/0016300 A1 | 1/2006 | Bubel | |
| 2007/0289391 A1 | 12/2007 | Gao | |
| 2008/0015034 A1 | 1/2008 | Downey | |
| 2010/0179560 A1 | 7/2010 | Chenaux | |
| 2010/0216585 A1 | 8/2010 | Imase | |
| 2011/0000347 A1 | 1/2011 | Stark | |
| 2011/0061500 A1 | 3/2011 | Huang | |
| 2012/0031261 A1 | 2/2012 | Gagnon | |
| 2012/0055296 A1 | 3/2012 | Landowski | |
| 2013/0199345 A1 | 8/2013 | Nino | |
| 2013/0226192 A1 | 8/2013 | Nino | |
| 2013/0305889 A1 | 11/2013 | Nino | |
| 2014/0000420 A1 | 1/2014 | Chuang | |
| 2015/0148175 A1 | 5/2015 | Kierspe et al. | |
| 2015/0151416 A1 | 6/2015 | Chen | |
| 2015/0321326 A1 | 11/2015 | Nino | |
| 2016/0184043 A1 | 6/2016 | Ivinson | |
| 2017/0232592 A1 | 8/2017 | Nino | |
| 2018/0223912 A1 | 8/2018 | Nino | |
| 2018/0290274 A1 | 10/2018 | Nino | |

FOREIGN PATENT DOCUMENTS

| | | |
|---|---|---|
| WO | 2014116414 A1 | 7/2014 |
| WO | 2014116484 A1 | 7/2014 |
| WO | 2015153376 A1 | 10/2015 |

OTHER PUBLICATIONS

Written Opinion dated May 24, 2017, issued in International patent application PCT/US2017/014970 filed Jan. 25, 2017.
International Preliminary Report on Patentability dated Mar. 14, 2019 in International patent application PCT/US2017/014970 filed Jan. 25, 2017.
Zincland; Hypocycloid Gear Reduction, May 11, 2016. Retrieved from the Internet on Mar. 20, 2017. URL: <http://web.archive.org/web/20160511041614/http://www.zincland.com/hypocycloid/>.
Doctek; Hypocycloid How to Part 2—Some Experiments, Feb. 28, 2016. Retrieved from the Internet on Mar. 20, 2017. URL: <http://web.archive.org/web/20160228057315/http://www.thingiverse.com/thing:81879>.
International Patent Application No. PCT/US2016/054940; Int'l Written Opinion and Search Report; dated Feb. 3, 2017; 12 pages.
International Patent Application No. PCT/US2016/055798; Int'l Written Opinion and Search Report; dated Dec. 29, 2016.
International Patent Application No. PCT/US2016/035712; Int'l Written Opinion and Search Report; dated Sep. 12, 2016; 13 pages.
International Patent Application No. PCT/US2016/054940; Int'l Preliminary Report on Patentability; dated Apr. 19, 2018; 10 pages.
"Sinusoidal clutch gives screwdriver precise torque", Product Engineering, McGraw-Hill Publication, New York, NY, US, (19730201), vol. 44, No. 2, ISSN 0032-9754, p. 14/15, XP002080526.
European Patent Application No. 16854340.3; Extended Search Report; dated Mar. 27, 2019; 8 pages.
International Patent Application No. PCT/US2016/055798; Int'l Preliminary Report on Patentability; dated Apr. 19, 2018; 8 pages.
International Patent Application No. PCT/US2017/014967; Int'l Preliminary Reporton Patentability; dated Mar. 14, 2019; 10 pages.
Office Action dated Sep. 3, 2020 for U.S. Appl. No. 16/536,116 (pp. 1-9).
Office Action dated Sep. 28, 2020 for U.S. Appl. No. 15/946,246 (pp. 1-11).
European Patent Office Invitation pursuant to Rule 62a(1) EPC dated Feb. 21, 2020, 2 pages.
European Patent Office Invitation pusuant to Rule 62a(1) EPC for App. No. EP17847106.6, dated Feb. 21, 2020, 2 pages.
Notice of Allowance dated Feb. 23, 2021 for U.S. Appl. No. 15/946,246 (pp. 1-8).
European Patent Communication pursuant to Article 94(3) EPC of Application No. 17847107.4, dated Jun. 22, 2022.

* cited by examiner

SECTION A-A

|     |     | 1 Less Lobe | |     | RPM | | |
| --- | --- | --- | --- | --- | --- | --- | --- |
|     |     | Output1 | Output2 | 150 | 450 | 1000 | 1250 |
| 20 | 21 | 4.8% | 0.2% | 0.4 | 1.1 | 2.5 | 3.1 |
| 19 | 20 | 5.0% | 0.3% | 0.4 | 1.3 | 2.8 | 3.5 |
| 18 | 19 | 5.3% | 0.3% | 0.5 | 1.4 | 3.1 | 3.9 |
| 17 | 18 | 5.6% | 0.3% | 0.5 | 1.6 | 3.5 | 4.3 |
| 16 | 17 | 5.9% | 0.4% | 0.6 | 1.8 | 3.9 | 4.9 |
| 15 | 16 | 6.3% | 0.4% | 0.7 | 2.0 | 4.5 | 5.6 |
| 14 | 15 | 6.7% | 0.5% | 0.8 | 2.3 | 5.1 | 6.4 |
| 13 | 14 | 7.1% | 0.5% | 0.9 | 2.7 | 6.0 | 7.4 |
| 12 | 13 | 7.7% | 0.6% | 1.0 | 3.1 | 7.0 | 8.7 |
| 11 | 12 | 8.3% | 0.8% | 1.3 | 3.8 | 8.3 | 10.4 |
| 10 | 11 | 9.1% | 0.9% | 1.5 | 4.5 | 10.1 | 12.6 |
| 9 | 10 | 10.0% | 1.1% | 1.9 | 5.6 | 12.5 | 15.6 |
| 8 | 9 | 11.1% | 1.4% | 2.4 | 7.1 | 15.9 | 19.8 |
| 7 | 8 | 12.5% | 1.8% | 3.1 | 9.4 | 20.8 | 26.0 |
| 6 | 7 | 14.3% | 2.4% | 4.3 | 12.9 | 28.6 | 35.7 |
| 5 | 6 | 16.7% | 3.3% | 6.3 | 18.8 | 41.7 | 52.1 |
| 4 | 5 | 20.0% | 5.0% | 10.0 | 30.0 | 66.7 | 83.3 |
| 3 | 4 | 25.0% | 8.3% | 18.8 | 56.3 | 125.0 | 156.3 |
| 2 | 3 | 33.3% | 16.7% | 50.0 | 150.0 | 333.3 | 416.7 |
| 1 | 2 | 50.0% |  |  |  |  |  |
|     |     |     |     |     |     |     |     |
|     | Assumption: | | | | | | |
|     | Human hand can do 1 rotation every 3 seconds | | | | | | |
|     | 1/3 * 60 seconds = 20 rpm | | | | | | |

HYPOCYCLOID SPEED BUFFER

RELATED

This patent application is a 371 National Phase of International Patent Application No. PCT/US2017/014970 filed Jan. 25, 2017, which claims the benefit of U.S. provisional patent application No. 62/381,491 filed Aug. 30, 2016, and U.S. provisional patent application 62/381,497 filed Aug. 30, 2016, the disclosures of which are incorporated by reference in their entirety.

TECHNICAL FIELD

This disclosure relates generally to speed reduction devices and methods.

BACKGROUND

Tools used in different industries operate at many different speeds, and controlling the speed of operation is sometimes necessary.

DISCLOSURE

Many rotational tools (e.g. drills) operate at very high velocities, and it is sometimes necessary to reduce or limit how fast such tools spin. In the medical field, torque limiting devices in the operational theater are useful to reduce variables associated with fastening medical devices. However, unrestricted high-speed device operation may add unnecessary risk variables to a procedure.

According to aspects of some exemplary implementations of the disclosure, a reduction assembly has an upper housing, a drive shaft, a disk assembly, and a lower housing. The upper housing has a top portion with a first opening and a bottom portion with a second opening, and the first and second openings define a passage through the upper housing and the top portion and a bottom portion. The bottom portion has an external surface and an internal surface with a disk receptacle. The drive shaft has a top segment, a middle segment, and a lower segment. The top segment and the lower segment each have a centerline that lies on the same first axis. The middle segment has a centerline that lies on a second axis that is parallel to and displaced from the first axis. The disk assembly has a disk with a body and a plurality of lobes positioned around the body. The disk is configured to engage the disk receptacle. The body has an opening through it to engage with the middle segment of the drive shaft. The lower housing is configured to engage with the lower segment of the drive shaft.

According to aspects of some exemplary implementations of the disclosure, a reduction assembly has a drive shaft, a disk assembly, and a disk receptacle. The drive shaft has an input segment, an eccentric segment, and an output segment. The input segment and the output segment each have a centerline running along a same first axis. The eccentric segment has a center line running along a second axis that is parallel to and positioned a distance from the first axis. The disk assembly has a disk with a body and a plurality of lobes concentrically positioned around the body. The body has an opening extending through the body that is configured to slidably engage the eccentric segment of the drive shaft. The disk receptacle is configured to engage with the disk. The receptacle has a floor and a wall with a plurality of protrusions extending from the wall. The number of protrusions is equal to one more than the number of lobes on the disk.

According to aspects of some exemplary implementations of the disclosure, a method of reducing rotational velocity of a tool includes a step of engaging a tool with a reduction apparatus as it is described in any of the embodiments throughout this application. The method also includes a step of operating the tool once it is engaged with the reduction apparatus.

Torque limiting devices in the operational theater are useful to reduce variables associated with fastening medical devices.

DRAWINGS

Figure 23:
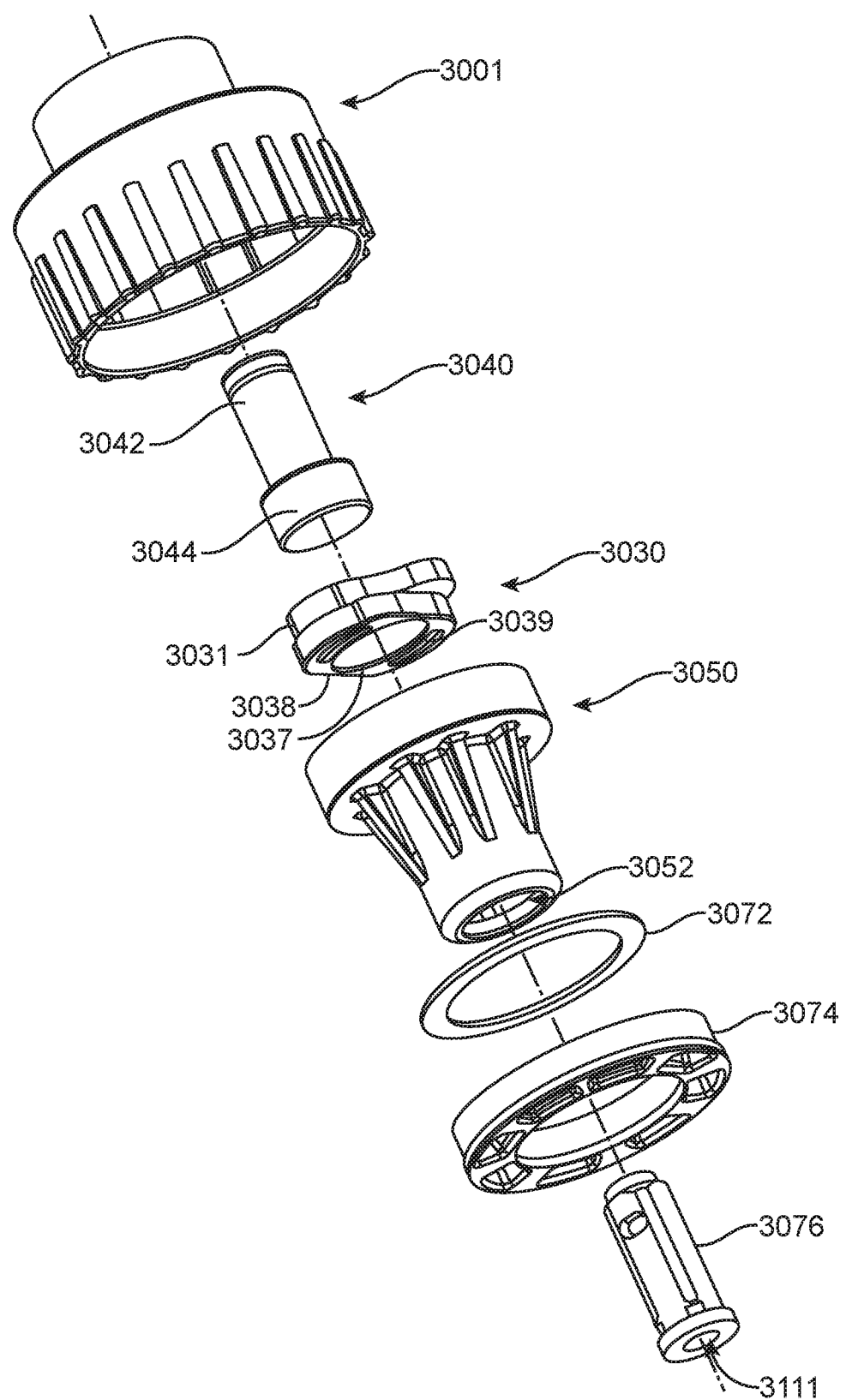
Figure 24:
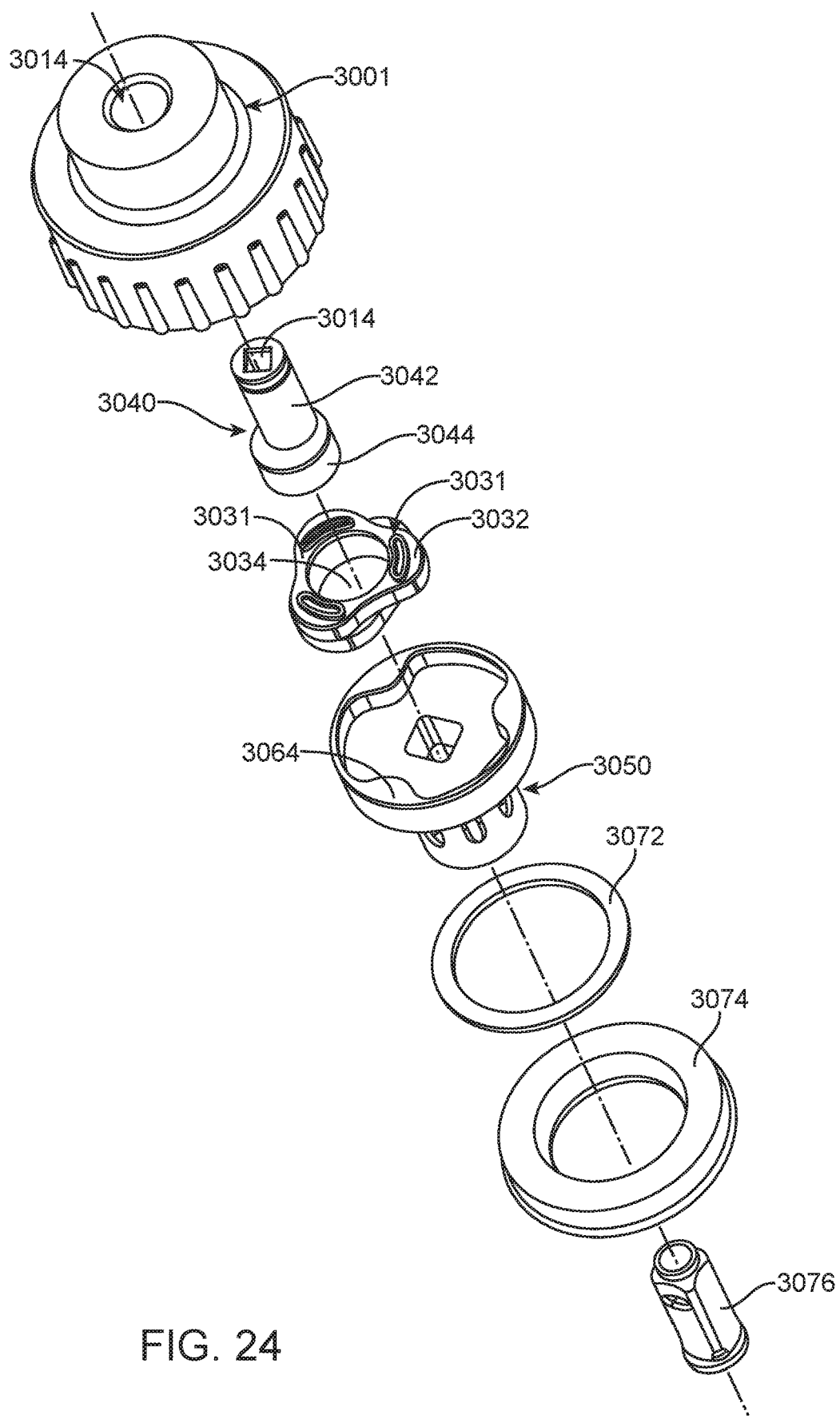
Figure 25:
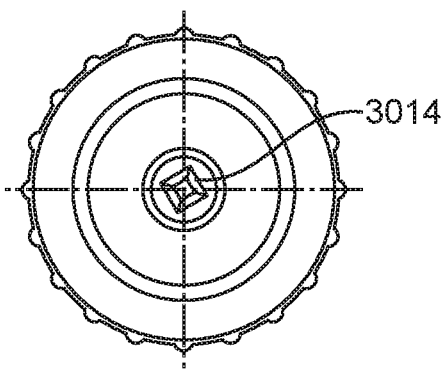
Figure 26:
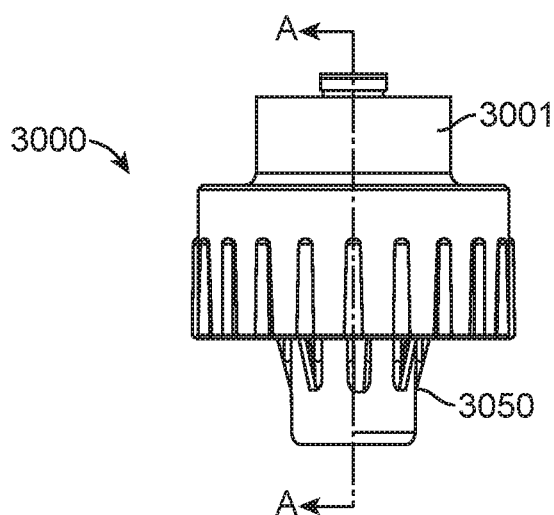
Figure 27:
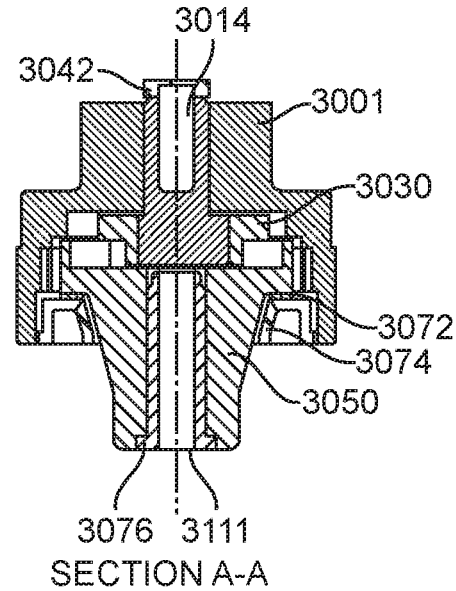

FIGS. 22A-D are alternative lobe and protrusion geometries for disks used reduction assemblies; and, FIG. 23 is an exploded view of an attachable embodiment of a reduction assembly;

FIG. 24 is an exploded view from a different angle of the embodiment shown in FIG. 23;

FIG. 25 is a top view of the reduction assembly shown in FIG. 23;

FIG. 26 is a front view of the embodiment shown in FIG. 25;

FIG. 27 is a cross-sectional view of the embodiment shown in FIGS. 25 and 26; and, FIG. 28 is a table showing aspects of lobe number to RPM reductions.

FURTHER DISCLOSURE

Some aspects of the disclosure will now be described in further detail with reference to the drawings, wherein like reference numbers refer to like elements throughout, unless specified otherwise. Certain terminology is used in the following description for convenience only and is not limiting.

For the purpose of illustrating the subject matter, there are shown in the drawings exemplary implementations of the subject matter; however, the presently disclosed subject matter is not limited to the specific methods, devices, and systems disclosed. In addition, the drawings are not necessarily drawn to scale.

The present disclosure may be understood more readily by reference to the following description taken in connection with the accompanying Figures and Examples, all of which form a part of this disclosure. It is to be understood that this invention is not limited to the specific products, methods, conditions or parameters described or shown herein, and that the terminology used herein is for the purpose of describing particular exemplars and implementations by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to apparatuses and methods of using said apparatuses. That is, where the disclosure describes or claims a feature associated with an apparatus or a method of using an apparatus, it is appreciated that such a description or claim is intended to extend these features or aspects in each of these contexts (i.e., apparatuses, methods of making, and methods of using).

In the present disclosure, the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the disclosure which are, for clarity, described herein in the context of separate exemplary implementations, may also be provided in combination in a single implementation. That is, unless obviously incompatible or specifically excluded, each individual exemplar is deemed to be combinable with any other exemplar(s) and such a combination is considered to be another exemplar. Conversely, various features of the disclosure that are, for brevity, described in the context of a single exemplar, may also be provided separately or in any sub-combination. Finally, while an exemplar may be described as part of a series of steps or part of a more general structure, each said step may also be considered an independent exemplar in itself, combinable with others.

The transitional terms "comprising," "consisting essentially of" and "consisting" are intended to connote their generally accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)." Exemplars described in terms of the phrase "comprising" (or its equivalents), also provide, as exemplars, those which are independently described in terms of "consisting of" and "consisting essentially" of.

When a list is presented, unless stated otherwise, it is to be understood that each individual element of that list, and every combination of that list, is a separate exemplar. For example, a list of exemplars presented as "A, B, or C" is to be interpreted as including the exemplars, "A," "B," "C," "A or B," "A or C," "B or C," or "A, B, or C."

Throughout this specification, words are to be afforded their normal meaning, as would be understood by those skilled in the relevant art. However, so as to avoid misunderstanding, the meanings of certain terms will be specifically defined or clarified.

A cycloidal speed reducer is described herein as a mechanism for reducing the speed of an input shaft by a certain ratio. The input shaft drives an eccentric bearing that in turn drives the cycloidal disk in an eccentric, cycloidal motion. The perimeter of this disk is geared to an annular receptacle. The input shaft is mounted eccentrically to a cycloidal disk, and when the shaft is rotated, the cycloidal disk moves in a circle. The disk has lobes protruding along its perimeter. The disk interacts with a disk receptacle that has protrusions, such as a ring gear. When the lobes of the disk interact with the protrusions of the receptacle, the cycloidal disk will independently rotate around its center. The direction of rotation is opposite to that of the input shaft. The number of protrusions on the receptacle may be greater than the number of lobes on the disk. The disk may be attached to an apparatus that will rotate slower than the rotation of the input shaft. The reduction rate of the cycloidal drive is obtained from the following formula, where P means the number of the protrusions on the receptacle and L is the number of lobes on the cycloidal disk.

$$r = \frac{P - L}{L}$$

Benefits of the cycloid drives disclosed herein over a traditional gear drive include, but are not limited to, greater durability, lower stresses on moving parts, fewer moving parts, difficulty in lining and arranging parts properly, difficulty in maintaining proper alignment over time, difficulty of fitting many parts into a smaller housing, and friction between all the moving parts.

Figure 1:
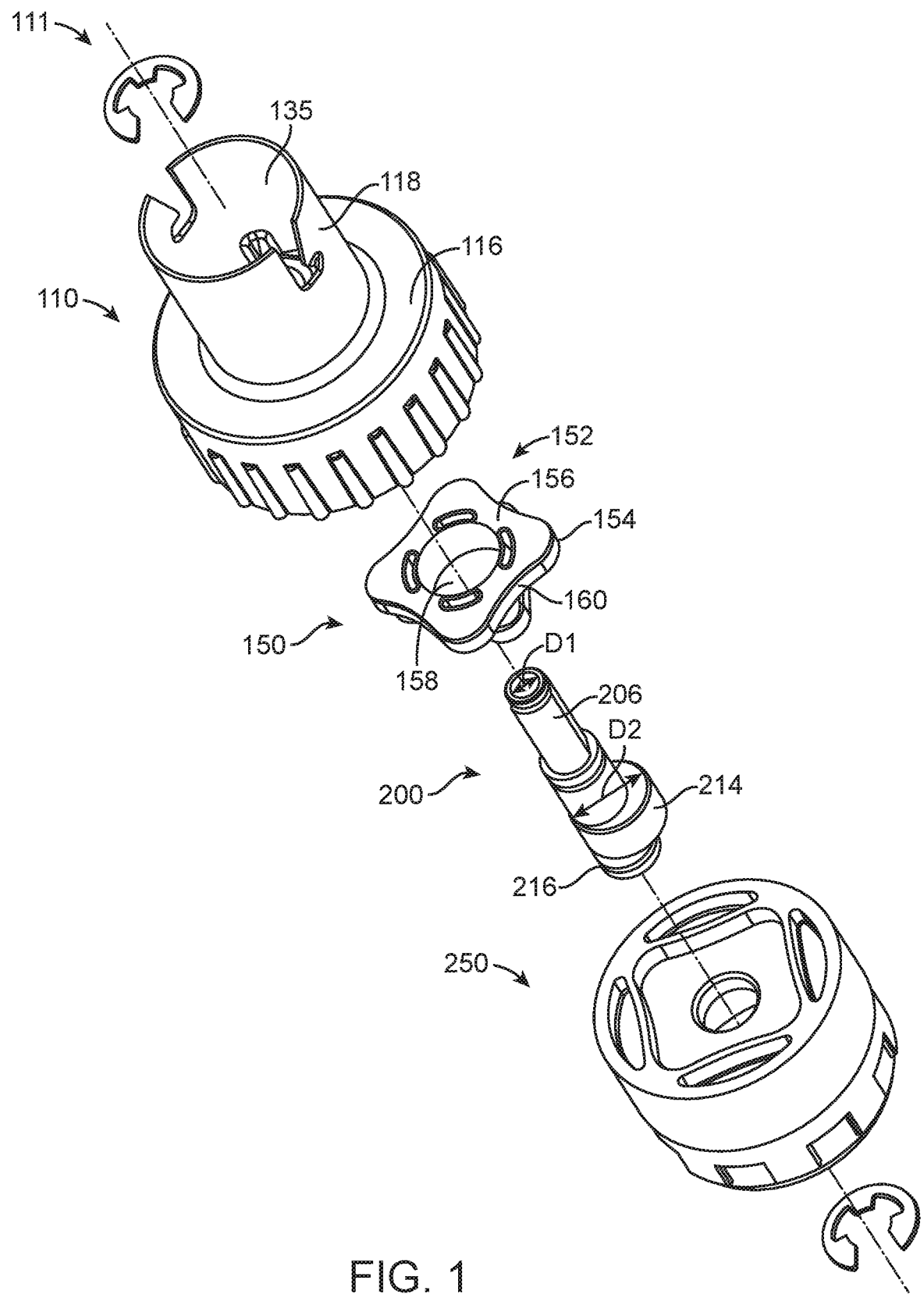
FIG. 1 is an exploded view of aspects of a reduction assembly.
Figure 2:
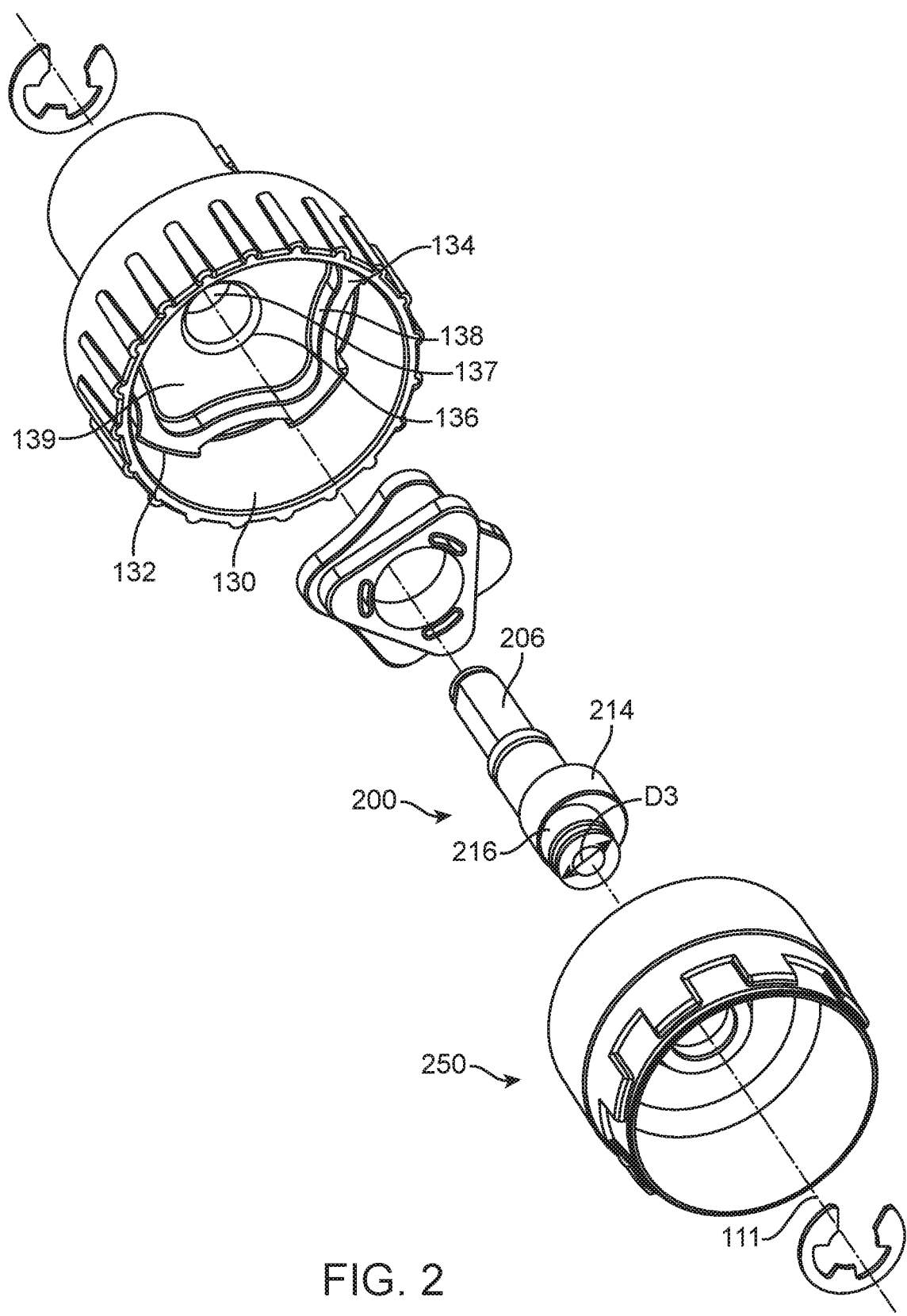
FIG. 2 is an exploded view from a different angle of the reduction assembly shown in FIG. 1.

A reduction assembly includes a drive shaft 200. Referring to FIGS. 1-2, the drive shaft 200 has an input segment 206, an eccentric segment 214, and an output segment 216. The drive shaft 200 may have additional segments as well. For example, it may have an intermediate segment 212 positioned between the input segment 206 and the eccentric segment 214. The drive shaft 200 may be a singular piece, or, in the alternative, it may be an assembly of multiple pieces. The drive shaft 200 may be solid or hollow. The drive shaft 200 may be solid throughout, hollow throughout, or solid in one or more locations and hollow in one or more locations. The drive shaft 200 may include various materials, such as, but not limited to, metals, plastics, or a combination of metals and plastics. It may be made of metals, such as, but not limited to stainless steel, aluminum, or other metal alloys. In a non-limiting example, the shaft may be made of SAE 316 grade stainless steel. The shaft may also be made of plastics, such as, but not limited to high-density polyethylene, low-density polyethylene, polyvinyl chloride, polypropylene, acrylonitrile butadiene styrene, polycarbonate, polyurethane, maleimide, bismaleimide, melamine formaldehyde, polyetheretherketone, polymethyl methacrylate, polytetrafluoroethylene, or a combination of one or more of plastics in this list.

In various aspects, parts of the reduction assembly may be made of various materials, including, but not limited to, those listed above.

In some aspects, the reduction assembly may be disposable. The reduction assembly may be used for a predetermined number of uses. Alternatively, the reduction assembly may be used for a predetermined duration of time. In some aspects, the reduction assembly is intended for singular use. In further aspects, the reduction assembly is intended to be used for a predetermined number of rotations. In some aspects, the entire reduction assembly is intended to be disposed of after a fixed usage period. In other aspects, portions of the assembly are intended to be disposed of while other portions are intended to be reused.

The drive shaft may attach to a rotational tool that rotates the shaft during operation. The reduction assembly may accept various rotational inputs. In some aspects, it may accept inputs of up to about 1200 rpm. In other aspects, it may accept higher rpm inputs. In some aspects of the disclosure, it may accept inputs of at least about 150 rpm; in some aspects, it may accept inputs of at least about 450 rpm; in some aspects, it may accept inputs of at least about 1000 rpm; in some aspects, it may accept inputs of at least about 1250 rpm.

Figure 3:
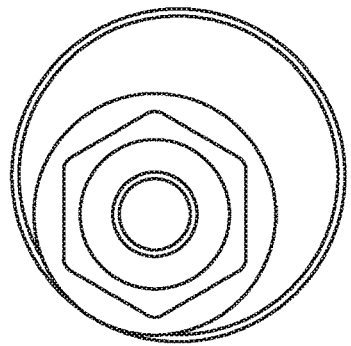
FIG. 3 is a top view of aspects of a drive shaft.
Figure 4:
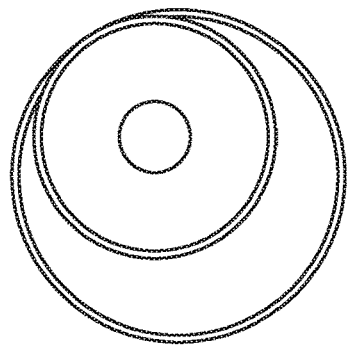
FIG. 4 is a bottom view of the drive shaft shown in FIG. 3.

The parts of the drive shaft 200 may be configured to have various cross-sectional shapes, such as, but not limited to, circular, triangular, square, pentagonal, hexagonal, heptagonal, octagonal, decagonal, dodecagonal, or another acceptable cross-sectional shape. The drive shaft 200 may have the same cross-sectional shape throughout, or the cross-sectional shape may vary throughout the drive shaft 200. The entire drive shaft 200 may have the same cross-sectional shape, one or more portions of the drive shaft 200 may have the same cross-sectional shape as another portion of the drive shaft, or none of the portions of the drive shaft may have the same cross-sectional shape as another portion of the drive shaft. Referring to FIGS. 3 and 4, for example, the aspects illustrated show portions of the drive shaft having circular and hexagonal cross sections.

The drive shaft 200 may vary in size. The length of the drive shaft may be scalable. For example, the drive shaft 200 may be at least about 1 mm long. The drive shaft may also be between about 1 mm long and about 1000 mm long. It may also be between about 1 mm long and about 500 mm long. It may also be between about 1 mm long and about 100 mm long. It may also be between about 1 mm long and about 50 mm long.

The length of the drive shaft 200 may vary throughout. All sections of the drive shaft 200 may have about the same length, some sections of the drive shaft 200 may have about the same length as another section of the drive shaft, or none of the sections of the drive shaft 200 may have about the same length as any other section of the drive shaft.

The diameter of the drive shaft 200 may be scalable. The diameter may be at least about 1 mm. The diameter may also be between about 1 mm and about 1000 mm. The diameter may also be between about 1 mm and 500 mm. The diameter may also be between about 1 mm and 100 mm. The diameter may also be between about 1 mm and 50 mm.

The diameter of the drive shaft 200 may vary throughout. All sections of the drive shaft 200 may have about the same diameter, some sections of the drive shaft 200 may have about the same diameter as another section of the drive shaft, or none of the sections of the drive shaft 200 may have about the same diameter as any other section of the drive shaft.

The drive shaft 200 may have additional features, such as notches, flanges, or engagement surfaces. Features may appear on any portion of the drive shaft 200.

The input segment 206 may have additional features to engage an element. For example, the input segment 206 may have one or more engagement surfaces 208. The input segment 206 may also have one or more retainer grooves 210 or 218. The input segment may also have additional features.

The output segment 216 may have additional features. For example, the output segment 216 may have one or more engagement surfaces 208. The output segment 216 may also have one or more retainer grooves 210 or 218. The output segment may also have additional features.

Referring to FIGS. 3 and 4, the eccentric segment 214 of drive shaft 200 may have a circular cross section. The eccentric segment 214 may be cylindrical in shape. The outer surface of the eccentric segment 214 may be configured to slidably engage another portion of the reduction assembly. The eccentric segment 214 may be modified to improve engagement with another portion of the assembly. Methods of doing this include, but are not limited to, making the eccentric segment 214 out of material that has a low coefficient of friction when in contact with another surface, coating the eccentric segment 214 with a material that has a low coefficient of friction when in contact with another surface, applying a lubricant to either the eccentric segment, the contact surface, or both, positioning a plurality of ball bearings or similar structures between the eccentric segment and the other portion of the assembly, or any combination of approaches in this list.

Figure 5:
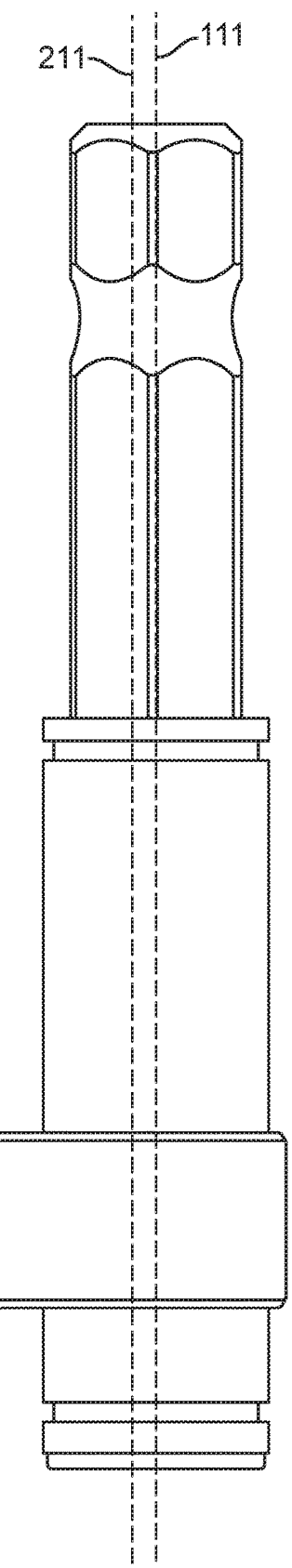
FIG. 5 is a front view of the drive shaft shown in FIGS. 3 and 4.
Figure 6:
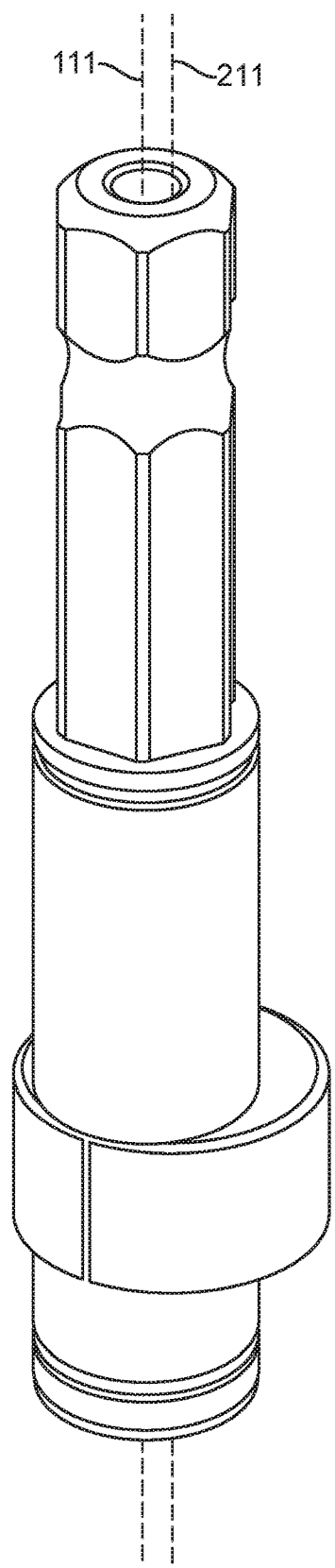
FIG. 6 is a perspective view of aspects of a drive shaft.
Figure 7:
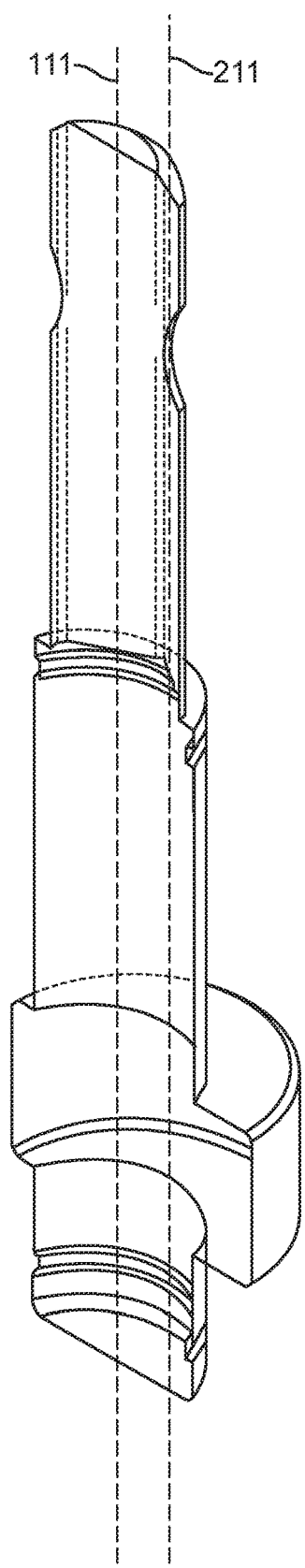
FIG. 7 is a cross-sectional view of the drive shaft shown in FIG. 6 that shows a first axis and a second axis.
Figure 8:
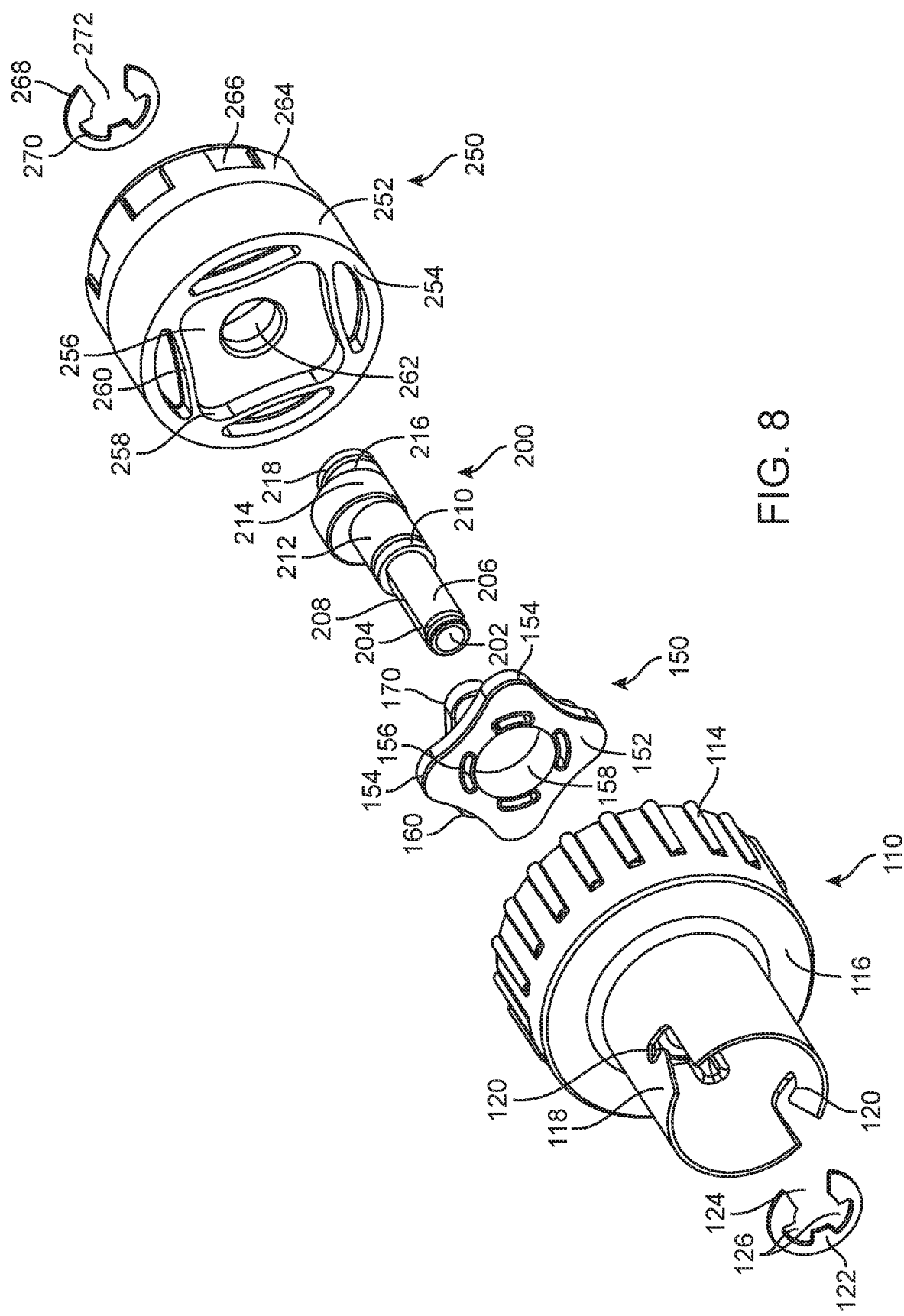
FIG. 8 is an exploded view showing aspects of a reduction assembly.
Figure 9:
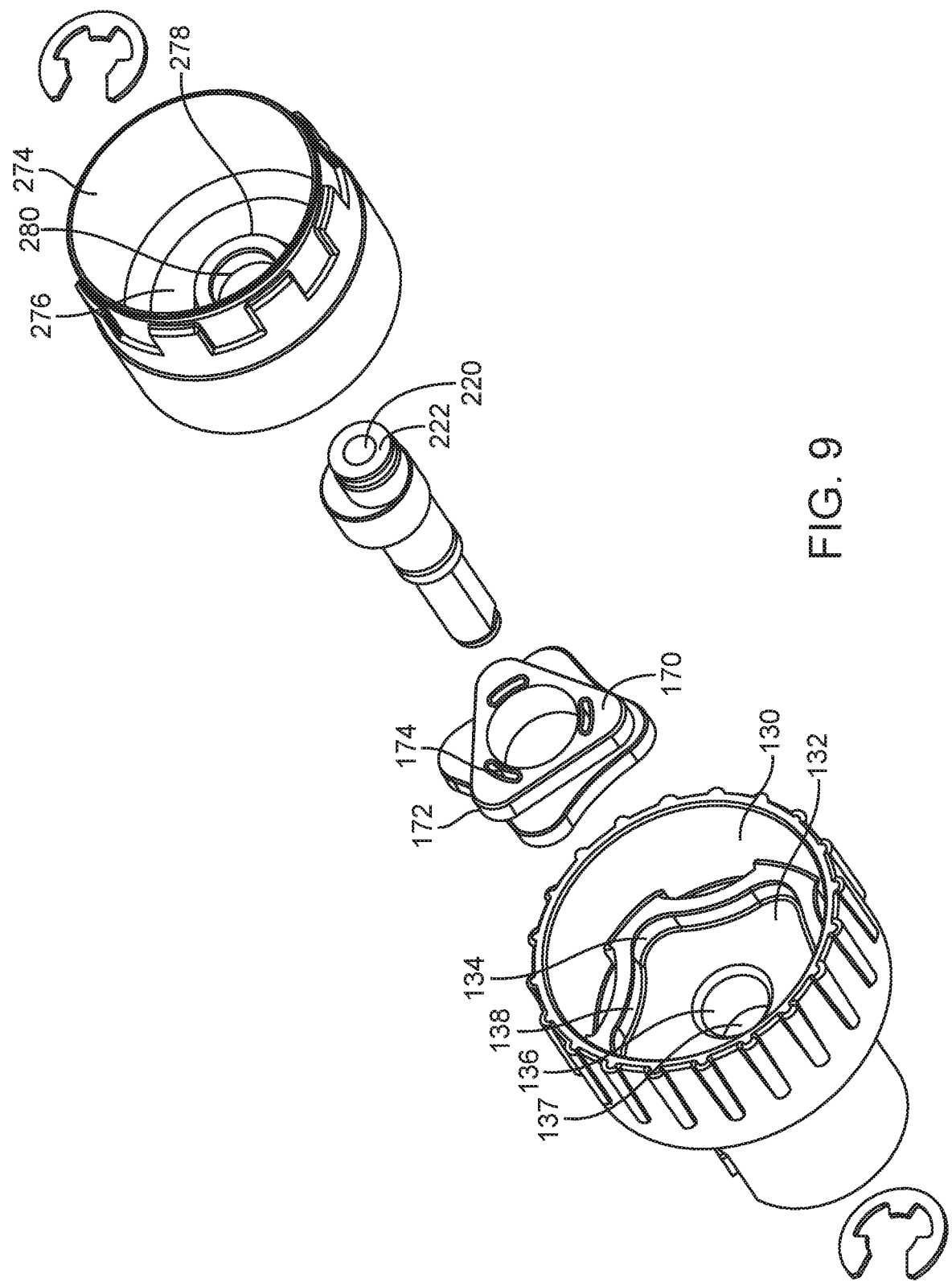
FIG. 9 is an exploded view from a different angle of the reduction assembly shown in FIG. 8.

The drive shaft 200 may have a plurality of axes running through it (for example, such as those illustrated in FIGS. 5-7). A first axis 111 may run through at least a portion of the drive shaft 200. A second axis 211 may run through at least a different portion of the drive shaft 200. The second axis 211 may be parallel to the first axis 111. The second axis 211 may be positioned at a variety of acceptable distances away from the first axis 111. The second axis 211 may be positioned at least about 0.5 mm away from the first axis 111. The second axis 211 may be positioned at about 0.5 mm to about 500 mm away from the first axis 111. The second axis 211 may be positioned at about 0.5 mm to about 100 mm away from the first axis 111. The second axis 211 may be positioned at about 0.5 mm to about 50 mm from the first axis 111. The second axis 211 may be positioned at about 0.5 mm to about 10 mm from the first axis 111.

Multiple portions of the drive shaft 200 may have centerlines lying on the same axis. The centerline of the input segment 206 and the centerline of the output segment 216 may each lie on the same axis. The centerline of the eccentric segment 214 may lie on a different axis. The drive shaft 200 may have other portions that have centerlines that lie on either the first axis 111, the second axis 211, or another acceptable axis. The centerline of the eccentric segment 214 may run along a second axis 211. The second axis may be parallel to the first axis 111. If the drive shaft 200 rotates around the first axis 111, any portions of the drive shaft whose centerlines lie on the first axis will rotate around their centerlines; any portions whose centerlines do not lie on the first axis will still revolve around the first axis, but they will not rotate along their centerlines. If the drive shaft rotates around the first axis 111 and the eccentric segment 214 lies on the second axis 211, then the eccentric segment 214 will revolve around the first axis, but it will not rotate around its own center.

In some aspects of the reduction assembly, the input segment 206 and the output segment 216 of the drive shaft 200 are aligned such that their centers have a centerline running along a same axis. In this aspect, when the input segment 206 rotates around an axis running through its center, the output segment 216 also rotates around the same axis running through its center. The eccentric segment 214 is aligned such that its center has a centerline running along a second axis 211 that is parallel to the first axis 111 and is positioned a distance away from the first axis 111. The eccentric segment 214 is fixedly attached, either directly or through an intermediary, to the input segment 206 and the output segment 216. Because of this, the eccentric segment 214 revolves around the first axis and does not rotate around its own center.

Referring to FIGS. 1-2 and 8-9, the reduction assembly includes a disk assembly 150. Disk assembly 150 includes at least one disk 152. The disk 152 may have a body 156 and a plurality of lobes 154. The lobes 154 may be positioned concentrically on the body 156. The disk 150 may have an opening 158 extending through the body 156. The opening 158 may be configured to slidably engage the eccentric segment 214 of the drive shaft 200.

The disk assembly 150 may have a plurality of disks 152. A disk assembly 150 may include 1, 2, 3, 4, 5, or another acceptable number of disks 152. Disks 152 may vary in size. For example, the disk 152 may be at least about 0.5 mm at its widest point, it may be between about 0.5 mm and about 500 mm at its widest point, it may be between about 0.5 mm and about 100 mm at its widest point, it may be between about 0.5 mm and about 50 mm at its widest point, it may be between about 0.5 mm and about 10 mm at its widest point, or it may be another acceptable width.

The disks 152 may have various shapes (in the place perpendicular to the first axis 111). The disks 152 may be oblong, circular, triangular, square, pentagonal, hexagonal, heptagonal, octagonal, or another suitable shape. The disk 152 may include various materials, such as, but not limited to, metals, plastics, or a combination of metals and plastics. It may be made of metals, such as, but not limited to stainless steel, aluminum, or other metal alloys. It may also be made of plastics, such as, but not limited to high-density polyethylene, low-density polyethylene, polyvinyl chloride, polypropylene, acrylonitrile butadiene styrene, polycarbonate, polyurethane, maleimide, bismaleimide, melamine formaldehyde, polyetheretherketone, polymethyl methacrylate, polytetrafluoroethylene, or a combination of one or more of plastics in this list.

Disk 152 has a plurality of lobes 154. The disk may have 2, 3, 4, 5, 6, 7, 8, 9, or more lobes. The lobes 154 may be positioned radially on the body of the disk such that they are equidistant from the disk's center. Lobes 154 may take a variety of shapes. Referring to FIG. 1, the lobes 154 may be rounded. Alternatively, the lobes 154 may be shaped to come to a pointed end. The lobes 154 may alternatively be shaped to come to a flat end. Lobes 154 may have other suitable shapes.

In some aspects, each disk 152 has a different number of lobes 154. The difference in number of lobes between adjacent disks may be 1, 2, 3, or another acceptable number. In some aspects, the difference in number of lobes between adjacent disks is 1. In an aspect of this invention, the disk assembly 150 has two disks 152. Referring to FIGS. 1 and 2, one of the two disks has four lobes, and the second disk has three lobes. In this aspect, the first disk has a cross-sectional shape (in the plane perpendicular to first axis 111) that is approximately square, and the second disk has a cross-sectional shape (in the plane perpendicular to first axis 111) that is approximately triangular.

In another aspect, the disk assembly 150 has three disks 152. The three disks may have four lobes, three lobes, and two lobes, respectively. Alternatively, the disks may have five lobes, four lobes, and three lobes, respectively. Alternatively, each disk may have a different suitable number of lobes.

In some aspects that include a plurality of disks, the disks may be fixedly connected to one another. The disk assembly 150 may be a singular piece, or, in the alternative, it may be an assembly of separate pieces. In alternative aspects, the disks may be rotationally or slidably connected to one another. Alternatively, the disks may be disconnected from one another. In some aspects, some of the disks may be connected to one another while other disks are disconnected.

Referring to FIGS. 1-9 the reduction assembly includes an upper housing 110 with a disk receptacle 132 and a lower housing 250. The disk receptacle 132 has a floor 139 and a wall 134. The wall 134 may have a plurality of protrusions 138 extending from the wall 134. The number of protrusions 138 may be equal to one more than the number of lobes on a disk 152. The protrusions on the wall may be various different shapes. In some aspects, the protrusions may be roller pins. The disk receptacle 132 may have an opening. The opening may engage the drive shaft 200. The disk receptacle may include various materials, such as, but not limited to, metals, plastics, or a combination of metals and plastics. It may be made of metals, such as, but not limited to stainless steel, aluminum, or other metal alloys. It may also be made of plastics, such as, but not limited to high-density polyethylene, low-density polyethylene, polyvinyl chloride, polypropylene, acrylonitrile butadiene styrene, polycarbonate, polyurethane, maleimide, bismaleimide, melamine formaldehyde, polyetheretherketone, polymethyl methacrylate, polytetrafluoroethylene, or a combination of one or more of plastics in this list.

In aspects of the reduction assembly, there are as many disk receptacles as there are disks in the disk assembly. A disk engages with a disk receptacle. The number of protrusions on the disk receptacle may be greater than the number of lobes on a disk engaging with the disk receptacle. In some aspects, the number of protrusions may be one greater than the number of lobes. Alternatively, the number of protrusions may be two greater than the number of lobes. FIGS. 1 and 2 show two disks in a disk assembly. In this exemplar, there are also two disk receptacles. The first disk receptacle 132 has five protrusions 138 and is configured to engage with the first disk 152 that has four lobes 154. The second disk receptacle 256 has four protrusions 260 and is configured to engage with the second disk 170 that has three lobes 172. The first and second disks are conjoined and have a common opening 158. Protrusions may vary in shape and size. Protrusions may be formed from a continuous part of a disk receptacle. Alternatively, protrusions may be pins. In such implementations, the pins may rotate around their centers to facilitate engagement with the lobes of the disk.

Figure 10:
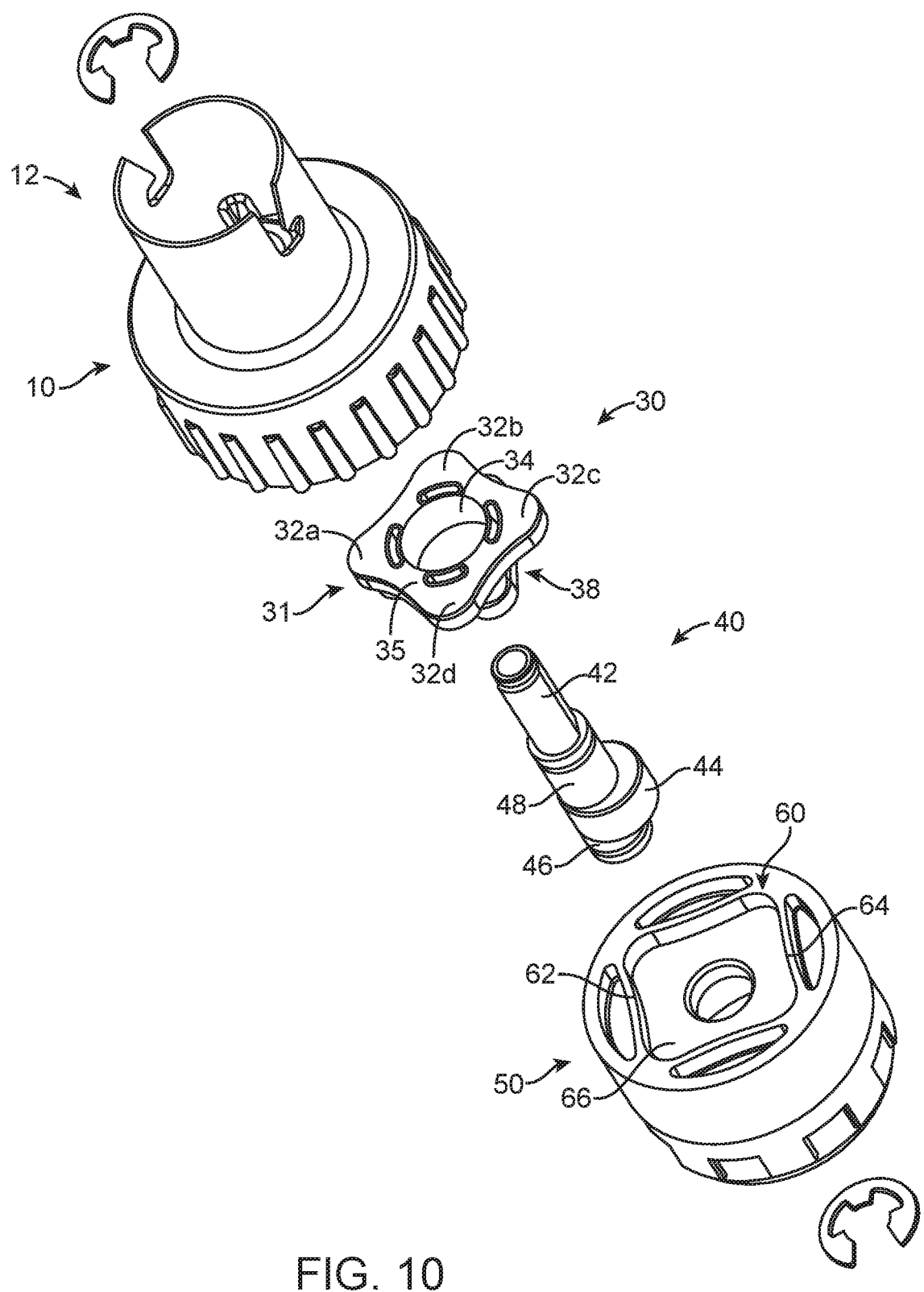
FIG. 10 is an exploded view illustrating aspects of a reduction assembly.
Figure 11:
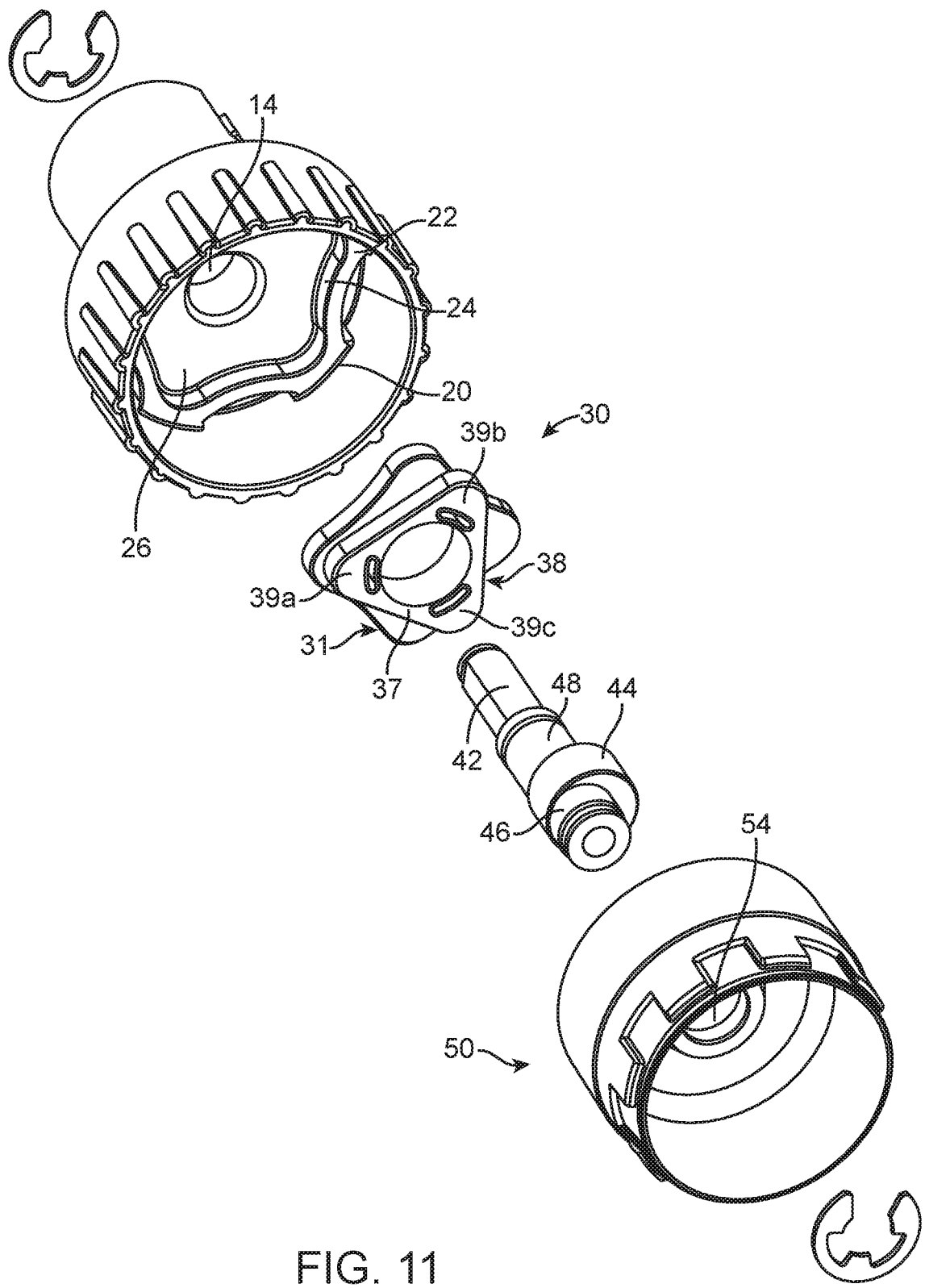
FIG. 11 is an exploded view from a different angle of the reduction assembly shown in FIG. 10.
Figure 12:
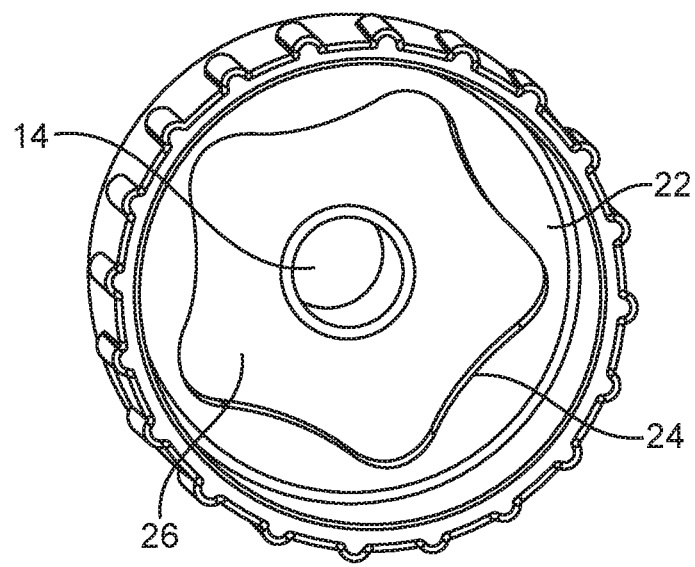
FIG. 12 illustrates aspects of a disk receptacle.
Figure 13:
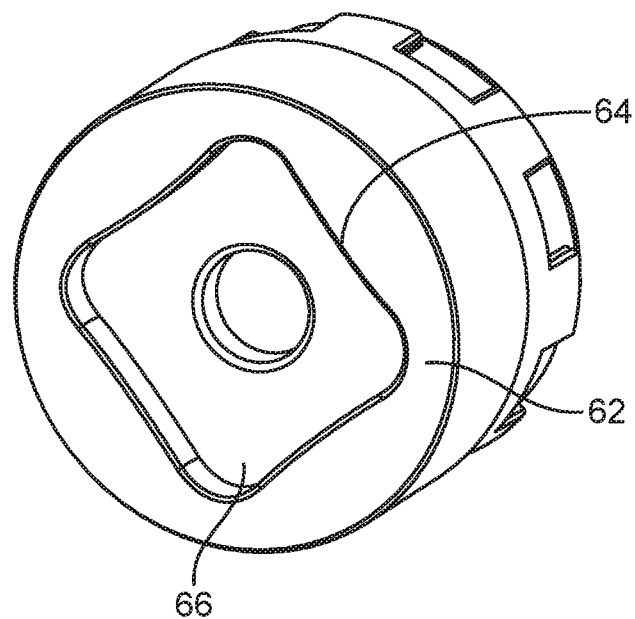
FIG. 13 illustrates aspects of a disk receptacle.

Referring to FIGS. 10 and 11, aspects of another reduction assembly include an upper housing 10, disk assembly 30, drive shaft 40, and lower housing 50. The upper housing includes a tool engagement portion 12, an opening 14, and a disk receptacle 20. The disk receptacle 20 includes a floor 26, wall 22, and protrusion 24. FIGS. 10 and 11 show a disk receptacle in the upper housing with five protrusions 24.

Figure 14:
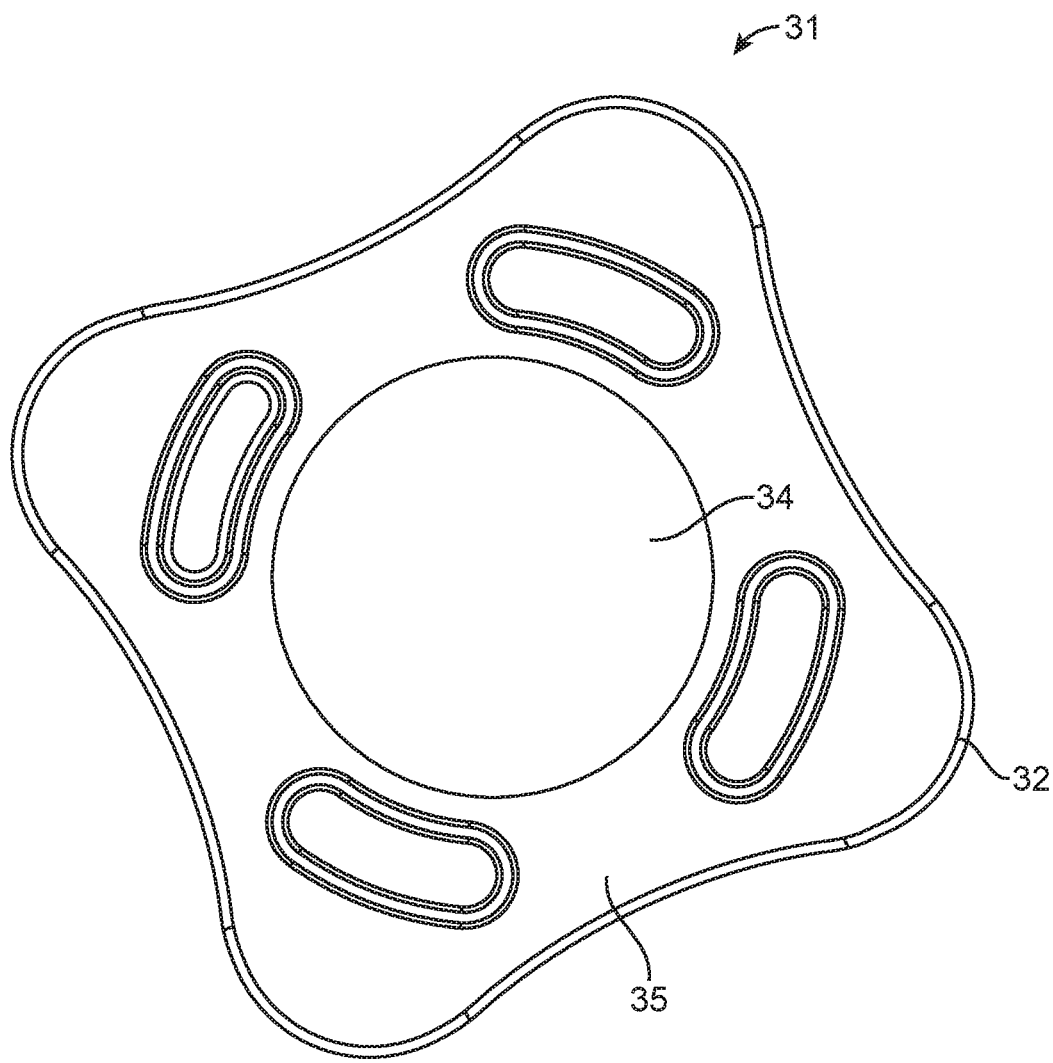
FIG. 14 illustrates aspects a disk having four lobes.
Figure 15:
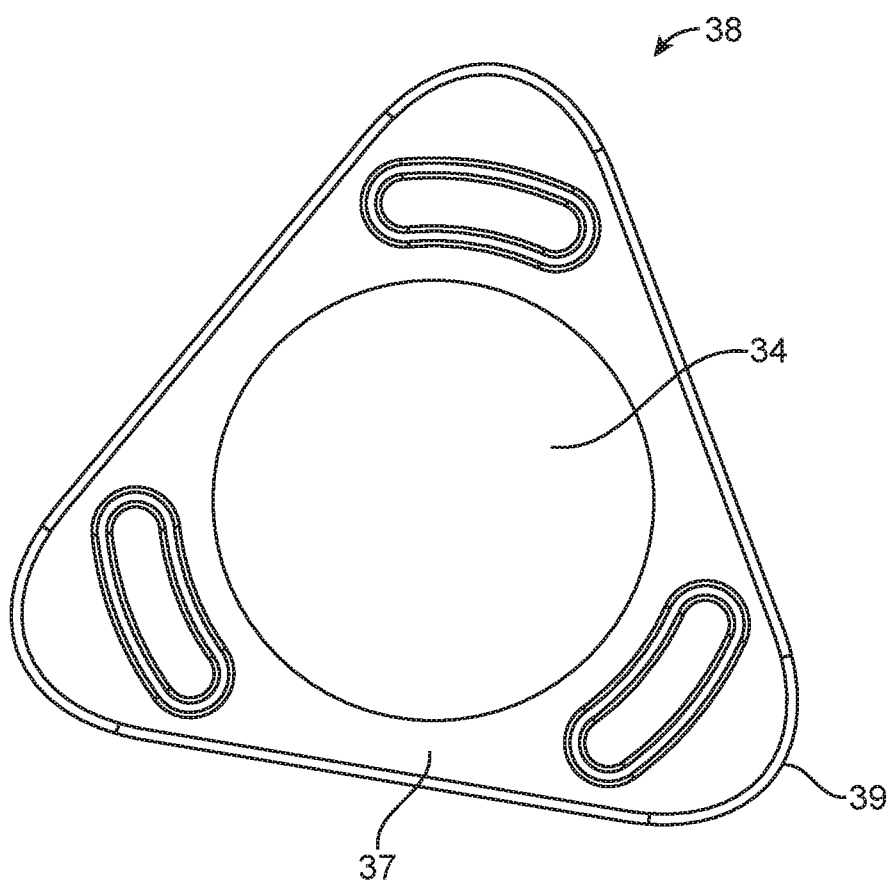
FIG. 15 illustrates aspects a disk having three lobes.
Figure 16:
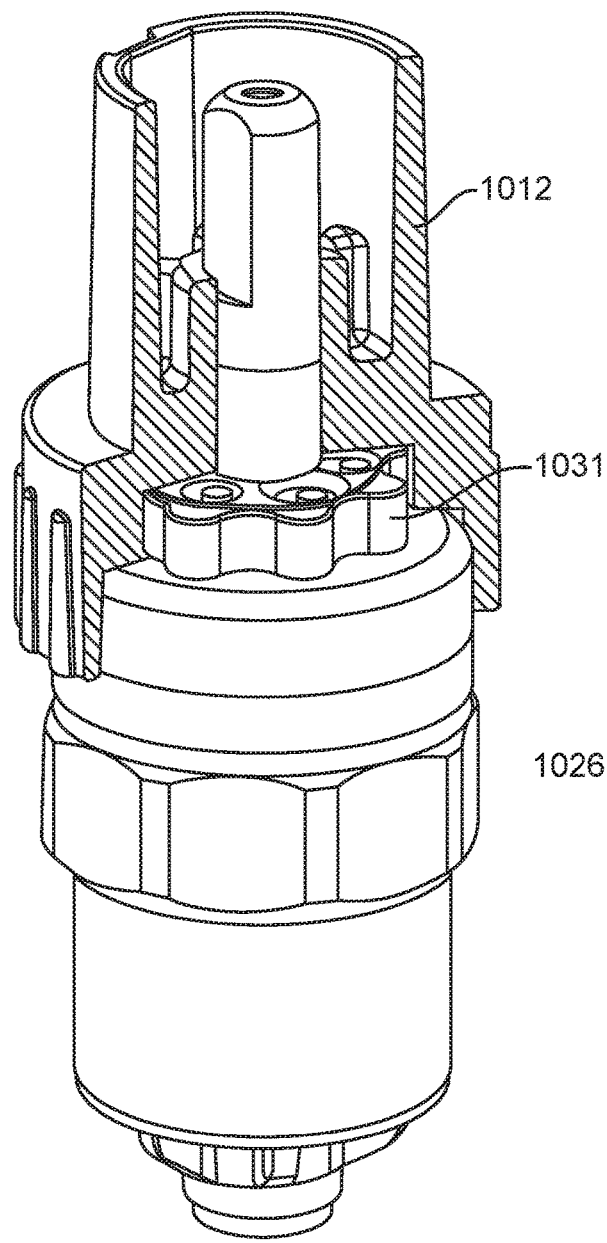
FIG. 16 illustrates aspects of a reduction assembly.

The disk assembly 30 includes at least one disk 31. Disk 31 has a body 35, an opening 34, and lobes 32. The disk 31 has four lobes 32, specifically lobes 32a, 32b, 32c, and 32d. The disk assembly 30 may include a plurality of disks. In the exemplary aspect shown in FIGS. 10 and 11, disk assembly 30 has two disks, disk 31 and disk 38. Disk 38 has body 37, opening 34, and lobes 39. Disk 38 has three lobes 39, specifically lobes 39a, 39b, and 39c. Disks 31 and 38 are further illustrated in FIGS. 14-15. Each disk in the plurality of disks in disk assembly 30 may be fixedly attached to another disk in the disk assembly. Alternatively, the plurality of disks may be one singular piece. Alternatively, each disk may be slidably or rotationally connected to at least one other disk. Referring to FIGS. 10 and 11, disk 31 and disk 38 are a singular piece and share an opening 34.

Still referring to FIGS. 10 and 11, the lower housing 50 includes an opening 54 and a disk receptacle 60. Disk receptacle 60 includes wall 62, floor 66, and protrusions 64. In FIGS. 10 and 11 shows a disk receptacle in the lower housing with four protrusions 64.

Still referring to FIGS. 10 and 11, the drive shaft 40 includes an input segment 42, an intermediate segment 48, an eccentric segment 44, and an output segment 46. The input segment 42 may be configured to pass through opening 34 of a disk in the disk assembly 30 and through the opening 14 in the upper housing and to attach to a tool (not shown). The output segment 46 may be configured to pass through an opening 54 in the lower housing 50. The eccentric segment 44 may be configured to pass through the opening 34 of a disk in disk assembly 30 and to slidably engage the disk assembly. In some aspects of the drive shaft (shown in FIGS. 8 and 9), the drive shaft may have additional features, such as, but not limited to, retainer grooves 204, 210, and 218.

In some aspects of the reduction assembly, a disk engages with a disk receptacle. The disk is positioned on an eccentric segment of a drive shaft. When the drive shaft rotates around its center, the eccentric segment revolves around that center and does not rotate around its center. The disk positioned on the eccentric drive shaft similarly revolves around the center of the drive shaft. When the disk engages with a disk receptacle, the lobes of the disk contact the protrusions of the disk receptacle. This may cause the disk to rotate around its center (and around the eccentric segment's center). Alternatively, the force exerted by the lobes of the disk on the protrusions of the disk receptacle may cause the disk receptacle to rotate. In some aspects, a reduction assembly may have multiple disks and disk receptacles. Each set of disk and disk receptacle may be fixedly connected to another set of disk and disk receptacle.

Referring to the exemplary aspect of FIGS. 1-2, a hypocycloid reduction assembly may have an upper housing 110 having a top portion 118 and a bottom portion 116. The top portion 118 has a first opening 135, and the bottom portion 116 has a second opening 136. The first opening 135 and the second opening 136 define a passage 137 through the top portion 118 and the bottom portion 116. The passage 137 extends along a first axis 111. The top portion 118 is configured to interface with a tool (not shown). The bottom portion 116 has an internal surface 130 and an external surface 112, the internal surface 130 having a disk receptacle 132. The hypocycloid reduction assembly depicted also includes a drive shaft 200 having a top segment 206, a middle segment 214, and a lower segment 216. The top segment 206 is configured to pass through the passage 137 of the upper housing 110 and to interact with the tool. The top segment 206 may have a first diameter D1 and a centerline aligned with the first axis 111. The middle segment 214 may have a second diameter D2 that is greater than the first diameter D1, and may have a centerline aligned to a second axis 211, the second axis 211 being parallel to the first axis 111 and positioned a first distance away from the first axis 111. The lower segment 216 may have a third diameter D3 that is less than the second diameter D2 and may have a centerline aligned with the first axis 111. The disk assembly in this exemplary aspect may include a disk 152 having a body 156 and a plurality of lobes 154 positioned radially around the body 156, the lobes 154 being configured to engage the disk receptacle 132 in the upper housing 110. The body 156 may have an opening 158 extending therethrough, the opening 158 being configured to engage with the middle segment 214 of the drive shaft 200. A lower housing 250 may be configured to engage with the lower segment 216 of the drive shaft 200.

Figure 17:
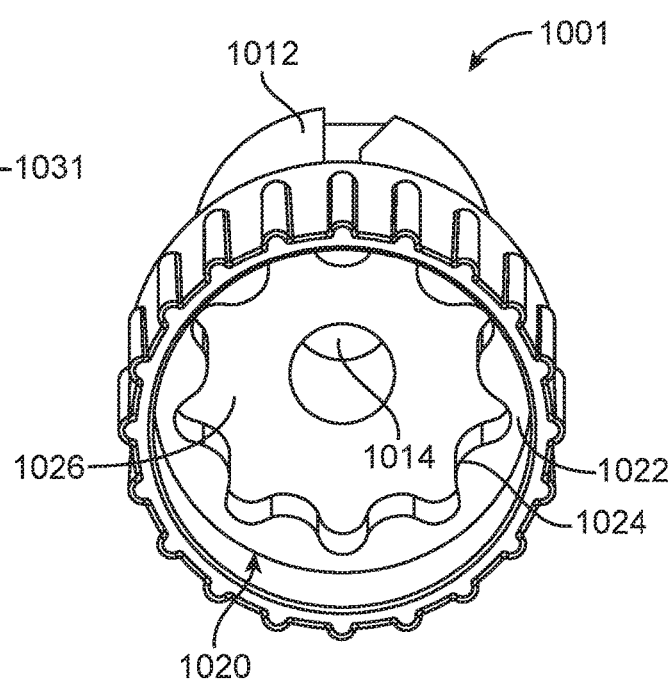
FIG. 17 is a disk receptacle of the reduction assembly shown in FIG. 16.
Figure 18:
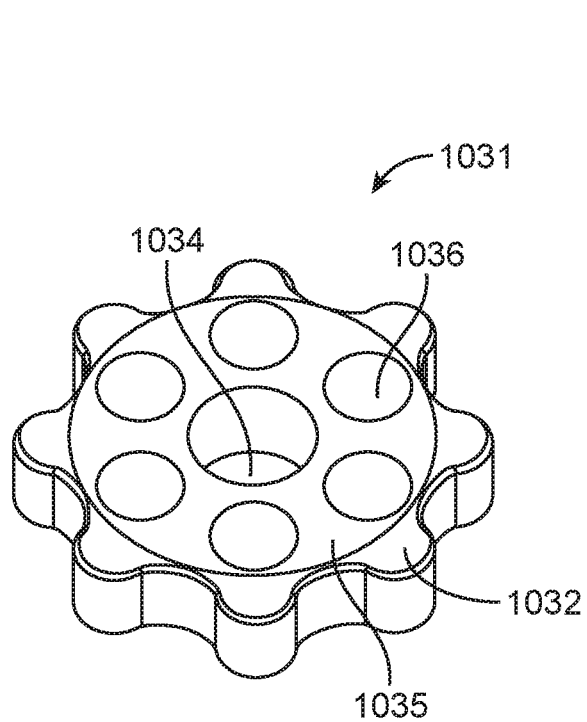
FIG. 18 is a disk of the reduction assembly shown in FIG. 16.
Figure 19:
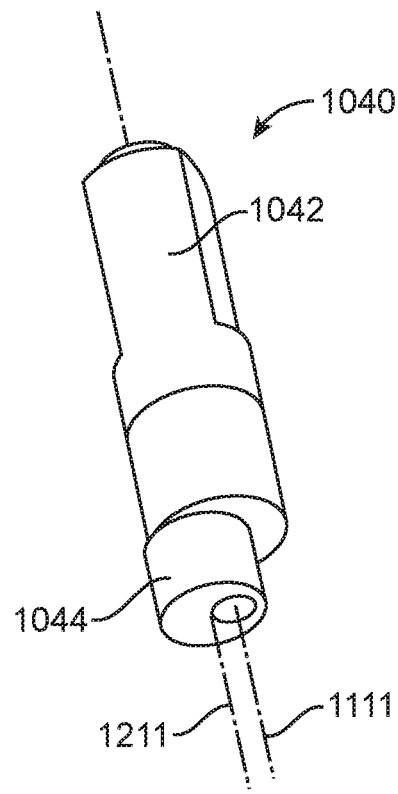
FIG. 19 is a drive shaft of the reduction assembly shown in FIG. 16.
Figure 20:
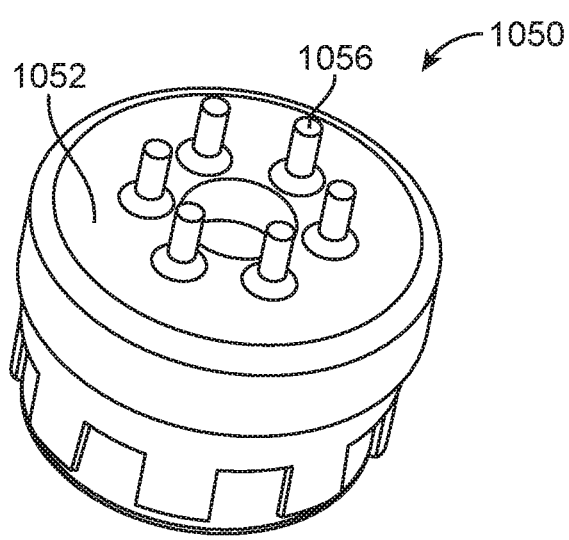
FIG. 20 is a lower housing of the reduction assembly shown in FIG. 16.
Figure 21:
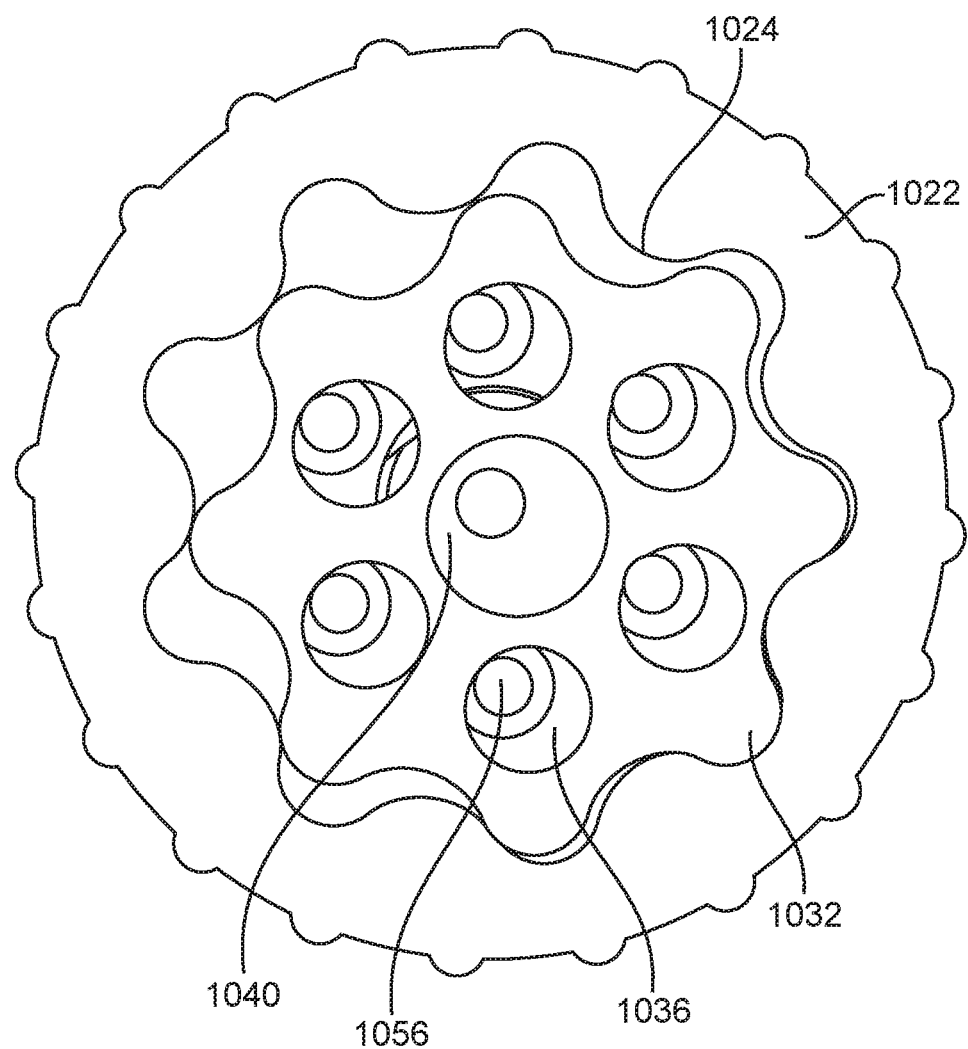
FIG. 21 is a cross-sectional view of the reduction assembly shown in FIG. 16.
Figure 22A:
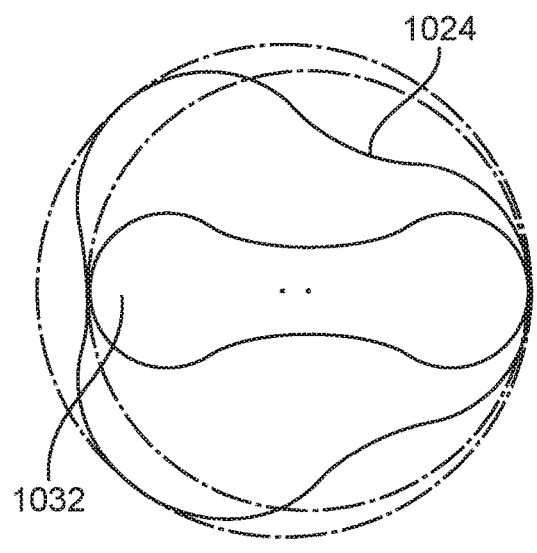
Figure 22B:
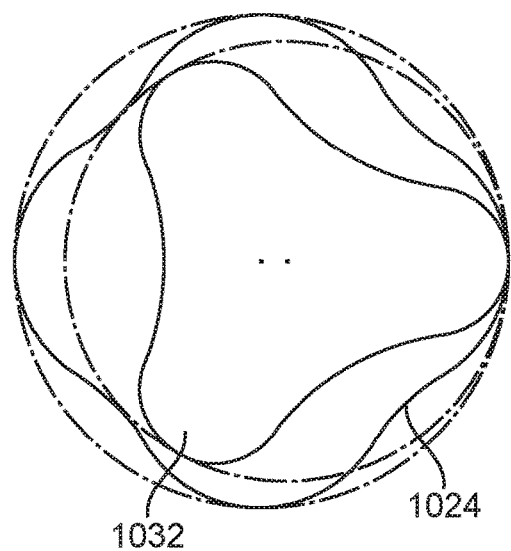
Figure 22C:
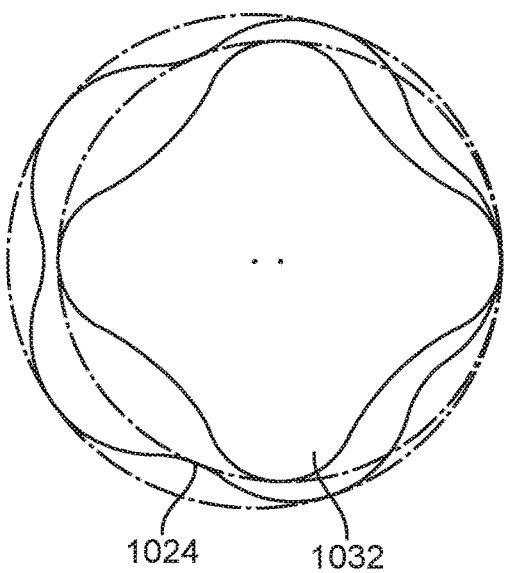
Figure 22D:
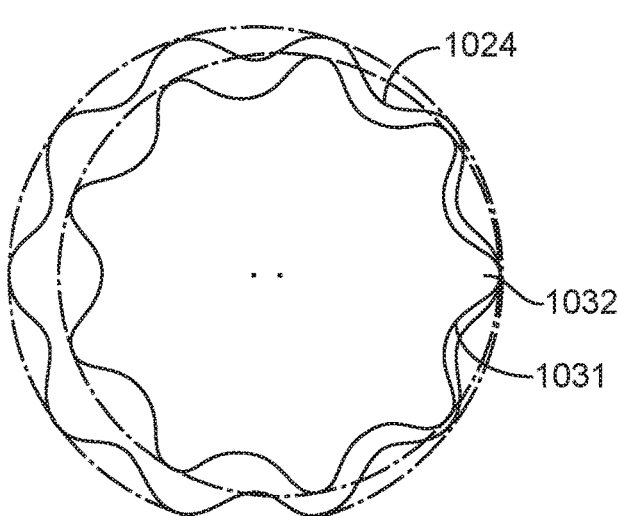

In yet another aspect of the reduction assembly, the assembly includes an upper housing, drive shaft, disk, and lower housing (FIGS. 16-21). Referring to FIG. 17, the upper housing 1001 has a tool engagement portion 1012, a disk receptacle 1020, and an opening 1014. The disk receptacle 1020 includes a floor 1026, a wall 1022, and protrusions 1024. Referring to FIG. 18, the disk 1031 includes a body 1035, central opening 1034, peripheral openings 1036, and lobes 1032. Referring to FIG. 19, the drive shaft 1040 includes an input segment 1042 and an eccentric segment 1044 a first axis 1111 and a second axis 1112. Referring to FIG. 20, the lower housing 1050 includes a top surface 1052 and pins 1056. The input segment 1042 of the drive shaft 1040 may pass through the opening 1014 of the upper housing 1001 and may engage with a tool (not shown). The eccentric segment 1044 of the drive shaft 1040 may be configured to engage with the central opening 1034 of the disk 1031. The eccentric segment may slidably contact the disk while engaged in the central opening 1034 of the disk. The pins 1056 of the lower housing 1050 may engage with the peripheral openings 1036 of the disk. The lower housing may have a single pin 1056, or, alternatively the lower housing may have a plurality of pins 1056. The disk 1031 may have a single peripheral opening 1036, or, alternatively, the disk may have a plurality of peripheral openings 1036. The number of peripheral openings 1036 on the disk may be the same as the number of pins 1056 on the lower housing. The disk 1031 may have a single lobe 1032 or a plurality of lobes 1032. The disk receptacle 1020 in upper housing 1001 may have a plurality of protrusions 1024. The number of protrusions 1024 may be equal to one more than the number of lobes 1032 on the disk. The number of protrusions 1024 may be equal to two more or three more than the number of lobes 1032 on the disk. The difference in number of protrusions 1024 and number of lobes 1032 may be another acceptable number. In the aspect of the reduction assembly shown in FIGS. 16-22, when the drive shaft 1040 rotates around the centerline of the input segment 1042 having a first axis 1111, the eccentric segment 1044 revolves around the center of the drive shaft at the first axis 1111, but not around the center of the eccentric segment 1044, the eccentric segment having a centerline along a second axis 1211. If the disk 1031 is engaged with the eccentric segment 1044, then the disk will also revolve around the center of the drive shaft. The lobes 1032 may engage the protrusions 1024 of the disk receptacle 1020 of the upper housing 1001. As the lobes engage the protrusions, the disk may rotate around its center. Alternatively, as the lobes engage the protrusions, the upper housing may rotate. Referring to FIGS. 21-22 and 28, in the aspect of the assembly shown, when the drive shaft rotates, the disk rotates around its center. The lobes 1032 of the disk engage with the protrusions 1024 of the disk receptacle. The disk 1031 may contact the top surface 1052 of the lower housing, or, alternatively, it may not contact the top surface 1052. The pins 1056 on the lower housing 1050 may engage with the peripheral openings 1036 of the disk 1031. In this aspect, as the disk 1031 rotates, the engagement between peripheral openings 1036 and pins 1056 creates forces acting on the pins and allows for rotation of the lower housing. The upper housing may be configured to attach to a tool at the engagement portion 1012, such as, but not limited to, a drill or another rotational tool. Alternatively, the upper housing may be part of a tool. The lower housing may also be configured to be attached to a tool, such as, but not limited to, a drill bit, cutting mechanism, velocity limiting device, torque limiting device, or another suitable tool. Alternatively, the lower housing may be part of a tool.

Referring to FIGS. 22A-D, various exemplary aspects of disks and disk receptacles are shown. Each disk has a plurality of lobes 1032, and each disk receptacle has a plurality of protrusions 1024.

A method of reducing rotational velocity includes connecting a rotational tool to a reduction assembly, such as one described herein, and then operating the rotational tool. The method may further include a step of disconnecting the rotational tool from the reduction assembly. The method may further include a step of disposing of the tool, the reduction assembly, or both after an acceptable number of uses or after an acceptable duration of use. The method may further include a step of connecting the reduction assembly to a second tool. The connection of the second tool may be made before connection of the first tool, after connection of the first tool, or while the first tool is connected. In some aspects, more tools may be connected in a variety of acceptable orders. The method may further include a step of connecting a torque limiting device to the reduction assembly.

In some aspects, a reduction assembly as described herein may attach to a tool. A tool may attach to an upper housing, to a lower housing, or to both, either independently or simultaneously. A reduction assembly may be used to decrease the rotational speed of a tool. For example, in some aspects, a drill may be attached to the reduction assembly. Alternatively, another suitable rotational tool may be attached to the reduction assembly. The tool may attach to an engagement surface of a drive shaft of the reduction assembly.

In some aspects, the reduction assembly may attach to a tool at an output end of the assembly, such as, but not limited to, a lower housing of the assembly or a disk of the assembly. The tool may be a rotational tool. It may be an assembly for altering rotational speed of a device. In some aspects, the tool may be a drill. Further in some aspects, the tool may be a device for controlling torque.

According to aspects of some implementations, a reduction assembly as described herein may include an adaptor configured to connect to at least one output device. An output device may be a device for controlling torque. Referring to FIGS. 23-27, a reduction assembly unit may include an upper housing 3001, a drive shaft 3040, a disk assembly 3030 having a first disk 3031 and a second disk 3038 and an opening 3034 through the conjoined first and second disk, and a lower housing 3050. The upper housing 3001 may define an opening 3014 that defines a passage through the upper housing 3001 and a first disk receptacle. The drive shaft 3040 may include an input segment 3042 and an eccentric segment 3044. The input segment 3042 may be configured to pass through the passage of the upper housing 3001 and to engage with an input tool. The input segment 3042 has a centerline along a first axis 3111. The eccentric segment 3044 may have a centerline along a second axis that is parallel to the first axis 3111 and positioned a first distance away from the first axis 3111.

The drive shaft 3040 has a motor output interface 3014 in an input segment 3042 to accept a motor output and an eccentric segment 3044. The eccentric segment 3044 may be configured to pass through the opening 3034 of the disk assembly 3030 and to slidably engage the disk assembly. The lower housing 3050 provides an adapter interface 3052 and may include a disk receptacle 3060 with protrusions 3064 to help connect the reduction assembly to an output device, such as, but not limited to, the adaptor 3076 in the adapter interface 3052. The adapter can mate with a torque limiting device via an interface 3052, a retainer ring 3074, and a washer 3072 are added to assemble the reduction assembly unit 3000. The reduction assembly may include multiples of each element as needed in various implementations.

Additional aspects of some implementations of a reduction assembly may include a disk 3031. A reduction assembly may include a plurality of disks. Referring to FIGS. 23-27, a reduction assembly may include two disks. The assembly may include a first disk 3031 and a second disk 3038. First disk 3031 may have three lobes 3032. Second disk 3038 may have two lobes 3039. An upper housing 3001 may have a first disk receptacle. Each disk may have a body 3035 and an opening 3034 extending through the body 3035. The first disk receptacle in the upper housing may have protrusions (not shown) that engage with the first disk 3031. The disk receptacle not shown may be configured as the disk receptacle 132 with a floor 139 and a wall 134 shown in FIG. 2. The first disk receptacle in the upper housing may have four protrusions. The lower housing 3050 may have a second disk receptacle 3060. The second disk receptacle may have three protrusions 3064 that engage with the lobes of the second disk 3038.

Experimental tests were conducted on some implementations of reduction assemblies described herein. Table 1 shows reduced output rotations based on input rotations and a correlation to lobe numbers. FIG. 28 shows the change in output at various RPM when the active lobe number is reduced.

TABLE 1

| 1000 | Input RPM | | | | | |
|---|---|---|---|---|---|---|
| Gear Ratios | 6 | 5 | 4 | 3 | 2 | 1 |
| 7 | 14% | | | | | |
| 6 | | 17% | | | | |

TABLE 1-continued

| 1000 | Input RPM | | | | | |
|---|---|---|---|---|---|---|
| Gear Ratios | 6 | 5 | 4 | 3 | 2 | 1 |
| 5 | | | 20% | | | |
| 4 | | | | 25% | | |
| 3 | | | | | 33% | |
| 2 | | | | | | 50% |
| | 2.4% | 3.3% | 5.0% | 8.3% | 16.7% | |
| Output RPM | 23.8 | 33.3 | 50.0 | 83.3 | 166.7 | |
| Output RPS | 0.40 | 0.56 | 0.83 | 1.39 | 2.78 | |

It will be understood that various aspects or details of the invention(s) may be changed without departing from the scope of the disclosure and invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention(s).

What is claimed is:

1. A hypocycloid reduction assembly, comprising:
    an upper housing having a top portion and a bottom portion,
        the top portion having a first opening and the bottom portion having a second opening, the first opening and the second opening defining a passage extending along a first axis;
        the top portion being configured to interface with a tool;
        the bottom portion having an internal surface and an external surface, the internal surface having a disk receptacle;
    a drive shaft, having a top segment, a middle segment, and a lower segment;
        the top segment being configured to pass through the passage of the upper housing and to interact with the too, the top segment having a first diameter (D1) and having a centerline aligned with the first axis;
        the middle segment having a second diameter that is greater than the first diameter, and having a centerline aligned to a second axis, the second axis being parallel to the first axis and positioned a first distance away from the first axis; and
    a disk assembly comprising:
        a plurality of disks, each having a body and a plurality of lobes positioned radially around the body, the lobes being configured to engage the disk receptacle in the upper housing, the body having an opening extending therethrough, the opening being configured to engage with the middle segment of the drive shaft; and
    a lower housing configured to engage with the lower segment of the drive shaft, wherein said lower housing further comprises a disk receptacle configured to engage one of said plurality of disks.

2. The reduction assembly of claim 1, wherein each disk of the plurality of disks has a different number of lobes.

3. The reduction assembly of claim 1, where the plurality of disks is two disks.

4. The reduction assembly of claim 3, wherein the first of the two disks has four lobes, and the second of the two disks has three lobes.

5. The reduction assembly of claim 1, wherein the plurality of disks is three disks.

6. The reduction assembly of claim 1, wherein the disk receptacle comprises a plurality of protrusions positioned radially around the center of the receptacle, the number of protrusions being equal to the number of lobes of the disk plus one.

7. The reduction assembly of claim 1, wherein the lower housing is formed as part of a torque limiting device.

8. The reduction assembly of claim 1, wherein the tool is a drill.

* * * * *